US008384555B2

(12) United States Patent
Rosen

(10) Patent No.: US 8,384,555 B2
(45) Date of Patent: Feb. 26, 2013

(54) METHOD AND SYSTEM FOR AUTOMATED DETECTION OF MOBILE PHONE USAGE

(76) Inventor: Michael Rosen, Akron, OH (US)

(*) Notice: Subject to any disclaimer, the term of this patent is extended or adjusted under 35 U.S.C. 154(b) by 556 days.

(21) Appl. No.: 12/685,454

(22) Filed: Jan. 11, 2010

(65) Prior Publication Data
US 2010/0130182 A1 May 27, 2010

Related U.S. Application Data

(63) Continuation-in-part of application No. 11/678,489, filed on Feb. 23, 2007, now Pat. No. 7,646,312, and a continuation-in-part of application No. 12/433,219, filed on Apr. 30, 2009, now Pat. No. 8,131,205.

(60) Provisional application No. 60/837,594, filed on Aug. 11, 2006, provisional application No. 61/049,610, filed on May 1, 2008, provisional application No. 61/175,952, filed on May 6, 2009.

(51) Int. Cl.
G08B 21/00 (2006.01)

(52) U.S. Cl. .............. 340/686.1; 340/933; 340/936; 455/456.1

(58) Field of Classification Search .......... 340/425.5, 340/426.1, 439; 455/364, 456.1, 564–565
See application file for complete search history.

(56) References Cited

U.S. PATENT DOCUMENTS

| 5,295,180 A | 3/1994 | Vendetti |
| 5,515,042 A | 5/1996 | Nelson |
| 5,636,265 A | 6/1997 | O'Connell |
| 5,655,019 A | 8/1997 | McKernan |
| 5,935,190 A | 8/1999 | Davis et al. |
| 5,948,038 A | 9/1999 | Daly et al. |
| 6,064,339 A * | 5/2000 | Wax et al. ............. 342/417 |
| 6,121,898 A | 9/2000 | Moetteli |
| 6,161,066 A * | 12/2000 | Wright et al. ............. 701/36 |
| 6,195,015 B1 | 2/2001 | Jacobs |
| 6,195,529 B1 | 2/2001 | Linz |
| 6,381,533 B1 | 4/2002 | Crane et al. |
| 6,393,254 B1 | 5/2002 | Pousada Carballo et al. |
| 6,393,301 B1 | 5/2002 | Oda |
| 6,422,713 B1 | 7/2002 | Fohl et al. |

(Continued)

FOREIGN PATENT DOCUMENTS
DE 198 07 825 A1 9/1999

OTHER PUBLICATIONS

Qingli Liu, et al., "A Unified MLSE Detection Technique for TDMA Digital Cellular Radio", IEEE, 1993, pp. 265-268.

(Continued)

*Primary Examiner* — Brian Zimmerman
*Assistant Examiner* — James Yang
(74) *Attorney, Agent, or Firm* — Christopher L. Parmelee; Walker & Jocke

(57) ABSTRACT

A method and apparatus for automated detection of mobile phone usage by drivers of vehicles includes at least one mobile phone signal receiving device, at least one image capturing device, at least one infrared illuminator and at least one computer. The mobile phone signal receiving device is operative to detect a mobile phone signal transmitted from a vehicle. The at least one image capturing device is operative to capture infrared light reflected off of the driver of the vehicle. The at least one computer is operative to store, in a storage device, information associated with at least one of the mobile phone signals transmitted from the vehicle and the at least one image of the vehicle. The information stored in the storage device may be used to determine if a person associated with the vehicle should be prosecuted for illegal use of a mobile phone while driving the vehicle.

17 Claims, 12 Drawing Sheets

U.S. PATENT DOCUMENTS

| | | | |
|---|---|---|---|
| 6,502,022 | B1 | 12/2002 | Chastain et al. |
| 6,542,730 | B1 | 4/2003 | Hosain |
| 6,556,810 | B2 | 4/2003 | Suzuki |
| 6,643,517 | B1 | 11/2003 | Steer |
| 6,687,497 | B1 | 2/2004 | Parvulescu et al. |
| 6,687,506 | B1 | 2/2004 | Girod |
| 6,690,940 | B1 | 2/2004 | Brown et al. |
| 6,701,158 | B2 | 3/2004 | Moreth |
| 6,720,889 | B2 | 4/2004 | Yamaki et al. |
| 6,728,542 | B2 | 4/2004 | Meda |
| 6,731,925 | B2 | 5/2004 | Naboulsi |
| 6,741,165 | B1 | 5/2004 | Langfahl et al. |
| 6,758,089 | B2 | 7/2004 | Breed et al. |
| 6,771,946 | B1 | 8/2004 | Oyaski |
| 6,782,240 | B1 | 8/2004 | Tabe |
| 6,792,295 | B1* | 9/2004 | Hanevich et al. .......... 455/569.1 |
| 6,803,854 | B1 | 10/2004 | Adams et al. |
| 6,810,321 | B1 | 10/2004 | Cook |
| 6,914,541 | B1 | 7/2005 | Zierden |
| 6,922,571 | B1 | 7/2005 | Kinoshita |
| 6,970,102 | B2 | 11/2005 | Ciolli |
| 6,973,333 | B1 | 12/2005 | O'Neil |
| 6,985,827 | B2 | 1/2006 | Williams et al. |
| 7,027,619 | B2 | 4/2006 | Pavlidis et al. |
| 7,123,874 | B1 | 10/2006 | Brennan |
| 7,181,229 | B2 | 2/2007 | Singh |
| 7,187,952 | B2 | 3/2007 | Lin |
| 7,187,953 | B2 | 3/2007 | Bauchot et al. |
| 7,292,848 | B2 | 11/2007 | Mazzara, Jr. |
| 7,301,494 | B2 | 11/2007 | Waters |
| 7,474,264 | B2 | 1/2009 | Bolduc et al. |
| 7,646,422 | B2 | 1/2010 | Kaisacanin et al. |
| 7,876,205 | B2 | 1/2011 | Catten et al. |
| 2001/0044312 | A1 | 11/2001 | Yamane |
| 2001/0050614 | A1 | 12/2001 | Yang |
| 2003/0137408 | A1 | 7/2003 | Breiner |
| 2004/0077339 | A1 | 4/2004 | Martens |
| 2004/0183694 | A1* | 9/2004 | Bauer ........................ 340/907 |
| 2004/0198306 | A1 | 10/2004 | Singh |
| 2004/0209594 | A1 | 10/2004 | Naboulsi |
| 2004/0246139 | A1* | 12/2004 | Harris ....................... 340/686.6 |
| 2005/0184860 | A1 | 8/2005 | Taruki et al. |
| 2005/0215241 | A1 | 9/2005 | Okada |
| 2005/0239479 | A1* | 10/2005 | Bednasz ................... 455/456.1 |
| 2005/0255874 | A1 | 11/2005 | Stewart-Baxter et al. |
| 2006/0055561 | A1 | 3/2006 | Kamali et al. |
| 2006/0099940 | A1 | 5/2006 | Pfleging et al. |
| 2006/0105701 | A1 | 5/2006 | Cornwell |
| 2006/0121951 | A1 | 6/2006 | Perdomo et al. |
| 2006/0155442 | A1* | 7/2006 | Luo et al. ........................ 701/45 |
| 2006/0232442 | A1* | 10/2006 | Vastad et al. ................ 340/932.2 |
| 2006/0252432 | A1 | 11/2006 | Gruchala |
| 2006/0286930 | A1 | 12/2006 | Rathus et al. |
| 2007/0026850 | A1 | 2/2007 | Keohane et al. |
| 2007/0035384 | A1 | 2/2007 | Belcher et al. |
| 2007/0202929 | A1 | 8/2007 | Satake |
| 2007/0254632 | A1 | 11/2007 | Beadle |
| 2007/0281603 | A1 | 12/2007 | Nath et al. |
| 2007/0290535 | A1 | 12/2007 | Meredith et al. |
| 2008/0043993 | A1* | 2/2008 | Johnson ........................ 379/386 |
| 2008/0064446 | A1 | 3/2008 | Camp et al. |
| 2009/0002147 | A1 | 1/2009 | Bloebaum et al. |
| 2009/0215387 | A1 | 8/2009 | Brennan et al. |
| 2010/0035632 | A1 | 2/2010 | Catten |
| 2010/0216509 | A1 | 8/2010 | Riemer et al. |
| 2010/0238065 | A1 | 9/2010 | Pitt et al. |
| 2011/0009107 | A1 | 1/2011 | Guba et al. |
| 2011/0021234 | A1 | 1/2011 | Tibbitts et al. |
| 2011/0080274 | A1 | 4/2011 | Reed et al. |

OTHER PUBLICATIONS

Sundeen, "Cell Phones and Highway Safety", 2005 State Legislative Update, Aug. 2005, National Conference of State Legislatures, Denver Colorado.

Strayer, et al., "A Comparison of the Cell Phone Driver and the Drunk Driver", Human Factors, Summer 2006, pp. 381-391, vol. 48, No. 2, Human Factors and Ergonomics Society, Salt Lake City, UT.

Stutts, et al., "Distractions in Everyday Driving", Jun. 2003, AAA Foundation for Traffic Safety, Washington DC.

Wisniewski, "Assembley, No. 3939", Dec. 11, 2003, State of New Jersey.

"Senate Bill No. 1613", Sep. 15, 2006, State of California.

"Raised Bill No. 5553", Feb. 2004, State of Connecticut.

"An Act", Spring 2004, District of Columbia.

"2006 Annual Report", 2006, Quixote Corporation.

"Annual Report 2005", 2005, Redflex Holdings Limited.

\* cited by examiner

METHOD AND SYSTEM FOR AUTOMATED DETECTION OF MOBILE PHONE USAGE

CROSS REFERENCE TO RELATED APPLICATIONS

This application is a continuation-in-part application of U.S. application Ser. No. 11/678,489 filed Feb. 23, 2007 (issuing as U.S. Pat. No. 7,646,312), which application claims the benefit pursuant to 35 U.S.C. §119(e) of U.S. Provisional Application Ser. No. 60/837,594 filed on Aug. 11, 2006. This application is also a continuation-in-part application of U.S. application Ser. No. 12/433,219 filed Apr. 30, 2009, which application claims the benefit pursuant to 35 U.S.C. §119(e) of U.S. Provisional Application Ser. No. 61/049,610 filed May 1, 2008. In addition, this application claims the benefit pursuant to 35 U.S.C. §119(e) of U.S. Provisional Application Ser. No. 61/175,952 filed May 6, 2009. All of these applications are hereby incorporated herein by reference in their entirety.

BACKGROUND ART

As mobile telephones ("mobile phones") have come into widespread use, people often use their mobile phones while driving vehicles. However, mobile phone usage by the driver of a vehicle can significantly distract the driver's attention from driving-related tasks. As result, mobile phone use while driving can significantly increase the risk of traffic violations and driving accidents.

Accordingly, it is desirable to provide a system and method which is operative to assist in decreasing traffic violations and driving accidents caused by mobile phone use while driving.

DISCLOSURE OF INVENTION

It is an aspect of at least one embodiment to provide a system and method which is operative to assist in decreasing traffic violations and driving accidents caused by mobile phone use while driving.

Further aspects of embodiments will be made apparent in the following Best Modes for Carrying Out Invention and the appended claims.

The foregoing aspects may be accomplished in at least one embodiment by an apparatus and method operative to detect mobile phone signals (which may include cell phone signals as well any other wireless signal with which a mobile phone may communicate). In an example embodiment, a method may comprise a step of detecting, through operation of at least one processor, at least one mobile phone signal (e.g., through use of a mobile phone signal receiving device). This described example method may also comprise a step of determining, through operation of the at least one processor, that the detected at least one mobile phone signal originated from a predetermined location. For example, the processor may be configured to determine that the detected signal has characteristics such as sufficiently high signal strength, duration, source movement and/or other characteristics which indicate that it originates from a particular predetermined location near one or more antenna of the mobile phone signal receiving device. Also, the processor may be configured to evaluate the detected mobile phone signal to determine that the detected signal corresponds to an ongoing voice communication, Internet access, or other human-involved activity with the mobile phone generating the detected mobile phone signal.

In addition, in this described example, the method may include a step of sending information, through operation of the at least one processor, to at least one remote server, which information includes data representative of the detection of the at least one mobile phone signal originating from the predetermined location.

In this described method, the predetermined location, for example, may include at least one of a vehicle (e.g., inside the vehicle), a portion of a roadway (through which vehicles pass), and a room in a building (e.g., a prison cell, hospital room, casino), or any other predetermined location at which mobile phone signals may be detected as originating therefrom.

In some embodiments, the method may include emitting radiation such as non-visible radiation (e.g., light such as infrared light that is not visible or is at least substantially not visible to human eyes) toward the predetermined location from at least one radiation transmitting device (e.g., an infrared light illuminator). In this described embodiment, the method may include receiving portions of the radiation with at least one radiation receiving device after the portions of the radiation have reflected off of matter inside and outside a vehicle. Such a radiation receiving device may correspond to one or more image capturing devices such as a still camera or a video camera capable of capturing light such as infrared light and/or visible light.

In addition, the method may include generating at least one digital image including a visual representation of at least portions of the matter inside the vehicle responsive to the received portions of the radiation. Also, in this described method, the information that includes data representative of the detection may include at least one digital image that depicts at least portions of the matter inside the vehicle, such as the occupants of the vehicle and/or an image of a driver or other occupant holding a mobile phone.

In an example embodiment, one or more radiation receiving devices may be positioned to view a license plate of the vehicle while in the predetermined location. Thus, in this embodiment, the method may include receiving further portions of the radiation with the at least one radiation receiving device after the further portions of the radiation have reflected off of a license plate of the vehicle. Also this embodiment may include generating at least one digital image depicting the license plate responsive to the received further portions of the radiation. In addition, in this embodiment, the information sent to the at least one computer may include the at least one digital image that depicts the license plate.

In further example embodiments, the method may include carrying out, through operation of at least one processor, facial recognition of at least one face depicted in the at least one digital image to determine data identifying a person. Also, in further example embodiments, the method may include determining, through operation of at least one processor, at least one characteristic regarding the vehicle depicted in the at least one digital image. Such determined characteristics may include for example, a make of the vehicle, a model of the vehicle, a type of the vehicle, and a color of the vehicle. Also, in further example embodiments, the method may include determining, through operation of the at least one processor, velocity of the vehicle, responsive to a plurality of digital images generated responsive to the radiation received with the at least one radiation receiving device.

In addition, in an example embodiment the method may include, verifying, through operation of the at least one processor, that the at least one digital image captured an image of the vehicle in the predetermined location at the time when the mobile phone signal was received by the mobile phone signal receiving device from a position originating from the predetermined location.

In an example embodiment of the method, the information sent to the remote server may include data usable by the remote server to determine the predetermined location from which the mobile phone signal was detected as originating. For example, in an embodiment, where the method is carried out to detect vehicles using mobile phones in a particular roadway (i.e., the predetermined location is a particular roadway), the data sent to the remote server may include the geographical location (e.g. a street address, roadway description, or other location data) usable to determine that roadway for which the mobile phone signal detection device is configured to monitor. Also for example, where the method is carried out in a vehicle (i.e., the predetermined location is in a particular vehicle), the data sent to the remote computer may include an identification for the vehicle or the person owning the vehicle, or other information usable to identify in which vehicle the mobile phone signal detection device is mounted. In addition, where the method is carried out in a building (i.e., the predetermined location is in a particular room such as a prison cell), the data sent to the remote computer may include a room number, or other identification which is usable to identity which room the mobile phone signal detection device sending the information is configured to monitor. In an example embodiment, the method may include configuring a data store in operative connection with the processor to include the data that is sent to the remote server to identify the predetermined location.

In an embodiment where the method is carried out inside a vehicle, the method may include determining, through operation of the at least one processor, a velocity of the vehicle. Responsive to the determined velocity, the processor may determine whether or not the vehicle was moving during the detection of the mobile phone signal in the vehicle. In an example embodiment, the method may include sending the information regarding the detection of the mobile phone signal only when the vehicle is moving or is moving at a speed above a configured threshold. In this described embodiment, the method may include sending the information from the vehicle through a wireless network (e.g., a cell phone network, IEEE 802.11a, b, g, n network, or other wireless network, using a wireless network interface device in operative connection with the described at least one processor.)

For example, in an embodiment in which the wireless network interface device corresponds to an IEEE 802.11a, b, g, n communication device, the method may include storing the detection of the mobile signal event, the time of the detection, the velocity of the vehicle, global positioning system (GPS) data, and or other detected data in a local data store. Then when the vehicle returns to a garage, parking lot or other location with a compatible wireless network, the method may at that time upload the data stored in the data store to the remote server. In addition, or alternatively, when the vehicle comes into range of a compatible wireless network, the method may include receiving, through operation of the at least one processor, a wireless signal through the wireless network interface device, which wireless signal is indicative of a request to cause the at least one processor to send through the wireless network the information from the data store that includes data representative of the detection of the at least one mobile phone signal.

The previously described embodiments have been described with respect to different features and steps that may be included in the described method or may be included in a system that carries out the described method. However, it is to be understood that the described features and steps may be combined in different combinations depending on the desired functionality of an implementation of the described system and method.

BEST MODES FOR CARRYING OUT INVENTION

Cellular ("cell") telephones are mobile phones which are capable of receiving and making telephone calls wirelessly within a cellular network. Mobile phones may also be capable of sending and/or receiving other content, such as text messages, e-mails, web pages, music, video and other information. Other types of mobile phones include satellite phones which are capable of receiving and making telephone calls wirelessly using one or more orbiting satellites. Also, other types of mobile phones may be capable of sending and receiving communications using wireless networking technology such as IEEE 802.11a, b, g, n wireless communications.

Mobile phones may be packaged as handheld devices. Mobile phones may also be integrated into a vehicle or coupled to a vehicle or the driver, such that a driver may make and receive mobile phone calls without holding a portable device. Such devices are often referred to as "hands-free" phones and may include mobile phones integrated into the vehicle, mobile phones connected to the vehicle via wireless technology (e.g., Bluetooth), mobile phones operated remotely through voice commands, and/or mobile phones operated using a headset. As used herein, a mobile phone includes any communication device capable of being used to carry out wireless phone calls, text messages, web browsing and other communications while driving a vehicle. For example, as used herein a mobile phone may include communication devices such as laptop computers, PDAs, netbooks, portable gaming devices, or any other type of devices which is capable of communication wirelessly from inside a vehicle.

Figure 16:
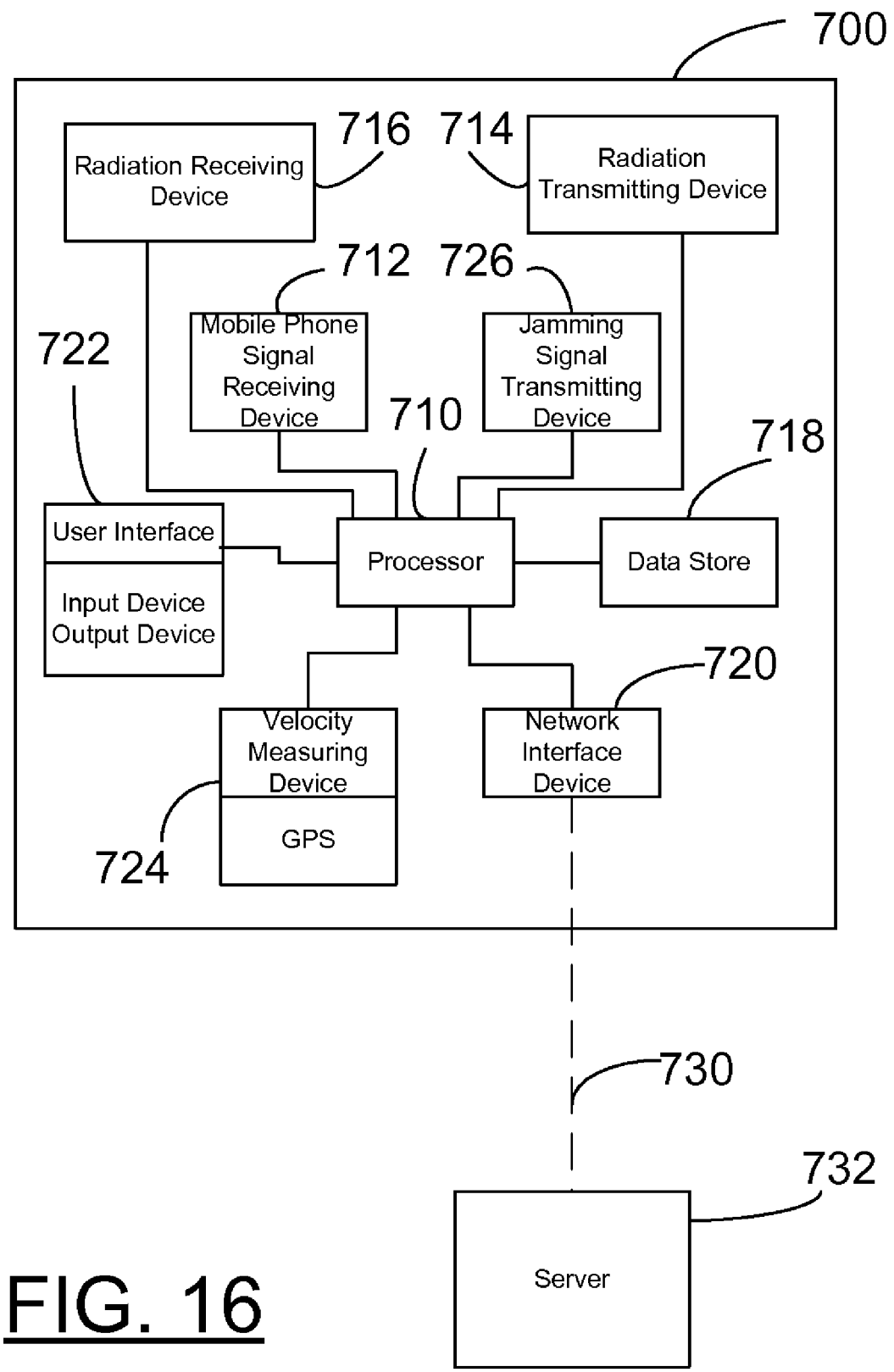
FIG. 16 illustrates an example detection system and various optional features of the system.

FIG. 16 illustrates an example detection system that is operative to carry out the methods described herein related to detecting mobile phone use in vehicles and other locations. As shown in FIG. 16, the detection system may include at least one processor 710. The processor may include software and/or firmware operative to cause the processor to operate one or more of the devices included in the system and to carry out the determination and calculations described herein. Such devices may include a mobile phone signal receiving device 712, which as described below in more detail is operative to use one or more antennas to receive mobile phone signals from a mobile phone in a predetermined location. The at least one processor 700 may be operatively programmed to evaluate characteristics of the detected mobile phone signal to determine that the detected at least one mobile phone signal originated from the predetermined location.

In this example, the detection system may include a network interface device 720 that is operative to communicate with at least one remote server 732 through a wired and/or wireless network 730. The at least one processor is operatively programmed to send information to at least one remote server, which information includes data representative of the detection of the at least one mobile phone signal originating from the predetermined location.

As described below in more detail, some embodiments of the detection system may include a radiation transmitting device 714 (e.g., an infrared light illuminator) operative to transmit radiation such as non-visible radiation (e.g., infrared light) toward the predetermined location. Also, as described below in more detail, in such embodiments the system may also include at least one radiation receiving device 716 (e.g., an image capturing device such as a still or video camera) that is operative to receive portions of the radiation after the portions of the radiation have reflected off of matter inside and outside a vehicle.

In addition, as described below in more detail, some embodiments of the detection system 700 may include at least one data store 718, a user interface 722, a velocity measuring device 724, and/or a jamming signal transmitting device 726. The data store 718 may correspond to a memory device operative to store software, configurable information, images, logs, and another data generated by or used by the at least one processor and other devices in the detection system. The user interface 722 may include one or more input devices and output devices through which a user may configure and operate the detection system. As discussed below in more detail, the velocity measuring device 724 may include a device that is capable of determining the velocity of a vehicle remotely (through images from a camera, lasers, radar, etc.) or may include a device that is capable of determining the velocity of vehicle while mounted in the moving vehicle (e.g., a GPS). The jamming signal transmitting device 726 is operative to generate a jamming signal capable of stopping or at least degrading a voice communication call or other communication being carried out through a detected mobile phone signal.

Although the detection system 700 has been described as including these various devices, it is to be understood that not all embodiments may include each of these devices. Rather, as explained below in more detail, different embodiments may include different sets of these devices, depending on the particular functions needed for the detection system.

For example, some states and other jurisdictions have passed legislation to forbid drivers from using hand-held mobile phones while driving. Other jurisdictions may forbid all mobile phone use while driving, including the use of hands-free phones. An example embodiment of the detection system includes a method of acquiring information leading to the detection and documentation of illegal mobile phone usage by a driver of a vehicle. This method is illustrated in the flowchart in FIG. 1.

A first step 10 in the method may include detecting a transmission from a mobile phone. A second step 20 in the method may include carrying out an evaluation of the signal to determine whether the signal indicates possible use of a mobile phone by a driver (or other person) in a vehicle. This evaluation may comprise identifying a geographic location of the source of the mobile phone signal transmission, and determining whether that location corresponds or potentially corresponds to a predetermined location within the physical bounds of a roadway.

If the source of a mobile phone signal transmission does not correspond, or likely does not correspond, to a predetermined location within the physical space of a roadway, then no further action need be taken, and in that event, listening for and detection of appropriate transmission signals can continue. If there is detection of a mobile phone signal transmission which originates or is likely to have originated within the physical boundaries of a roadway, this can initiate or permit further action which can comprise the acquisition of image data and/or other sensors.

The detection of a mobile phone transmission can comprise operating a mobile phone signal receiving device which may be tuned to detect signals at appropriate frequencies of the electromagnetic spectrum which is characteristic of mobile telephony usage. In current mobile telephony technology, there are several commonly used signal protocols and signal frequencies. Signal frequencies used for cellular and data transmissions include 900 MHz, 1.8 GHz and 2.1 GHz. Protocols include frequency division multiple access (FDMA), code division multiple access (CDMA); wideband CDMA; Universal Mobile Telephone System (UMTS); and time division multiple access TDMA such as GSM (Global System for Mobile Communications). Other protocols include satellite telephone, Wi-Fi, analog cellular services (AMPS, or Advanced Mobile Phone Service) and EDGE and GPRS for cellular data services, which could carry voice via Voice Over Internet Protocol; and WiMAX. Also, other protocols and wireless frequencies exist and are continually being developed. As used herein a mobile phone signal is defined as any type of wireless signal through which a mobile phone (or other portable device such as a tablet, laptop, or network) may wirelessly and remotely communicate voice and/or data.

Any particular protocol may have associated with it, its own transmission frequency and its own standard source strength. The source strength of the mobile phone signal transmission may be relevant for establishing a relationship between the signal strength received at the receiver and the distance between the transmitter and the receiver. It is possible that detected signal strength may be used as an indicator of how close the transmitting mobile phone is to the receiver, through the use of a known relationship between signal strength and distance. Because of the differences among the various protocols, such a relationship may be unique to a particular frequency band which is being monitored. There may be one relationship for one frequency and a different relationship for a different frequency.

In appropriate situations, the method may include a step 30 of acquiring images of the vehicle in the form of still images or video or both using an image capturing device such as a camera. Such images may be acquired from one camera or vantage point or from more than one camera or vantage point, as discussed elsewhere herein. At least some of the images may depict the driver and the portion of the vehicle in the region of the driver. At least some of the images may comprise sufficient detail to enable visual evaluation and decision-making about the existence of illegal mobile phone usage, as described elsewhere herein. The images, or other information acquired at the same time as the images, may be suitable to identify exactly where in the roadway the vehicle was when the images were taken, and to establish the existence of illegal mobile phone usage.

Acquiring images may further comprise acquiring other information which may be associated with those images, such as the time when the images are acquired and the location where the data is taken. Also, at least some of the acquired images may be suitable for identifying the vehicle or its driver, typically by acquiring an image of the vehicle's license plate. Any or all of this image acquisition may continue for a predetermined duration of time after the start of image acquisition, and then may cease.

In addition, other information associated with the vehicle may also be acquired by one or more sensor devices. For example, a sensor device may include a vehicle velocity measuring device such as a radar or laser gun capable of detecting the velocity of the vehicle. Such a vehicle velocity measuring device may be located in a different location than the cameras. In other embodiments, the road adjacent the mobile phone signal receiving devices may include other types of sensor devices, such as a vehicle presence detection device. A vehicle presence detection device may include mechanical sensors which are activated by the weight of the vehicle. Such a vehicle presence detection device may also include optical, electromagnetic and ultrasonic proximity detection sensors. Also, it is to be understood that one or more image capturing devices may correspond to the presence detection device. In example embodiments, the captured images and any other acquired information regarding the speed and/or position in time of the vehicle may be stored for later access to enable the system, law enforcement personnel, or other users to decide whether a law has been violated.

According to the details of current legislation in various jurisdictions, transmission of a mobile phone signal from within the physical boundaries of a roadway may indicate but does not necessarily indicate activity which is legally prohibited. There are several possibilities, as follows. One possibility is that a passenger in a vehicle, rather than the driver, may be using a mobile phone. Presumably this may be legal in many jurisdictions. Another possibility would be that the vehicle driver is using a hand-held mobile phone while driving. If there is any form of mobile phone usage which is illegal in a particular jurisdiction, most likely it is this activity which would be illegal. (However, in the event that traffic in the particular roadway was at a standstill or the vehicle were on the shoulder of the roadway, such usage would presumably be legal). Yet another possibility is that the driver might be engaged in a mobile phone conversation using a hands-free apparatus while driving. In some jurisdictions this action may be legal even if those same jurisdictions forbid use of a hand-held mobile phone by the driver. In other jurisdictions, use of a mobile phone by a passenger while the car is moving may be legal, while in other jurisdictions it may not be legal for the passenger to use the mobile phone while the car is moving.

An embodiment of the described method may include a method step 40 of evaluating the images and other acquired data to make a determination as to whether a law has been violated with respect to the particular mobile phone call detected. For example, image analysis may be used to determine if the car is moving during the time period that mobile phone use was detected. Further, the location of the vehicle in the images or the location detected by positional sensors in the road could be correlated with the features of the signals to verify that the particular vehicle being imaged corresponds to the vehicle from which cellular signals are emitting. In addition, a velocity captured for the vehicle may be compared to features of the mobile phone signals to verify that the vehicle being monitored is the correct vehicle from which mobile phone signals are being detected.

For example, the rise and fall of the signal strength of the mobile phone as the car moves toward and then away from an antenna of a mobile phone signal receiving device may be evaluated to determine a velocity of the mobile phone device. Such velocity information determined from the mobile phone signal may be compared to the velocity information determined from image data and/or a vehicle velocity measuring device. Correlation between the velocity information determined from the mobile phone and the velocity information determined from image data and/or other vehicle velocity measuring devices may be used by the system to determine that the vehicle being imaged corresponds to the source of the mobile phone signals. Also, the system may verify that the position of the vehicle at the peak signal strength for the mobile phone signal corresponds to the vehicle being at its closest position relative to the mobile phone detection sensor.

In further embodiments, the system may include image processing capabilities which are operative to determine whether the driver or passenger is holding a mobile phone. Further, such image analysis may determine if a passenger is present in the vehicle. In embodiments of the method, one or more of these described determinations, correlations, and verifications may be carried out to determine if there is evidence that illegal mobile phone usage is taking place in a particular moving vehicle.

In some embodiments, although one or more of these described determinations, correlations, and verifications may be carried out through operation of a computer processor in the system, it is also to be understood that one or more determinations may be carried out manually. For example, the system may make available one or more of the captured images, video, positional data, velocity data, signal strength data, and/or any other data captured by the system associated with an event. Law enforcement personnel or other users may view recorded images and may visually determine whether particular images show evidence of illegal mobile phone usage (such as use of a hand-held mobile phone) by a driver of a vehicle. If examination of images and/or other captured data indicates violation of a law by the driver (or passenger) of the vehicle, then the method may include the further step 50 of extracting information from images which can be used to automatically determine through operation of a computer and/or manually determine the identity of the vehicle or driver or both, such as from the license plate of the vehicle. In further embodiments, the system may include one or more cameras positioned to specifically capture license plate information from the front and/or the back of a vehicle.

In addition, the method may include a step 60 of initiating the prosecution of the offender for illegal mobile phone usage. For purposes of prosecution, the images may be suitable to serve as evidence which can be used during prosecution of the offender. In an example embodiment, the system may be operative to save in a local data store (and/or a data store associated with a remote server) one or more records corresponding to the event of the mobile phone usage. Such records may include the time, location and all or portions of the data captured for the event.

To initiate the prosecution, the system may be capable of facilitating the mailing of notices in the form of traffic tickets to the owner of the vehicles. Such notices may include a printed copy of the image(s) showing the illegal mobile phone usage, the license of the vehicle, and/or any other evidence captured by the system. Such tickets may include relevant information associated with how to pay the appropriate fine and/or the date to appear before a local court responsible for prosecuting the traffic violation.

Figure 1:
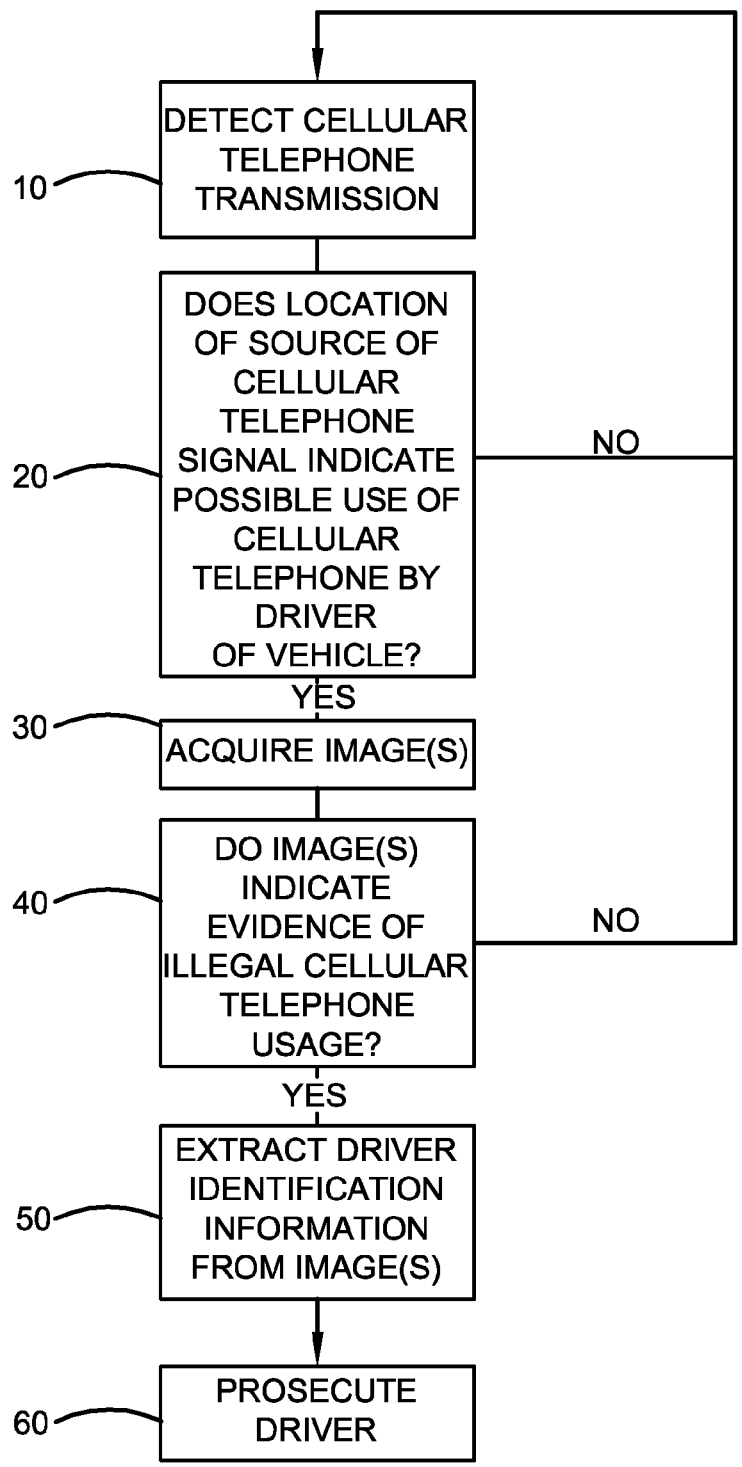
FIG. 1 is a flowchart of a method of detecting and prosecuting for illegal use of a mobile phone by a driver.
Figure 2:
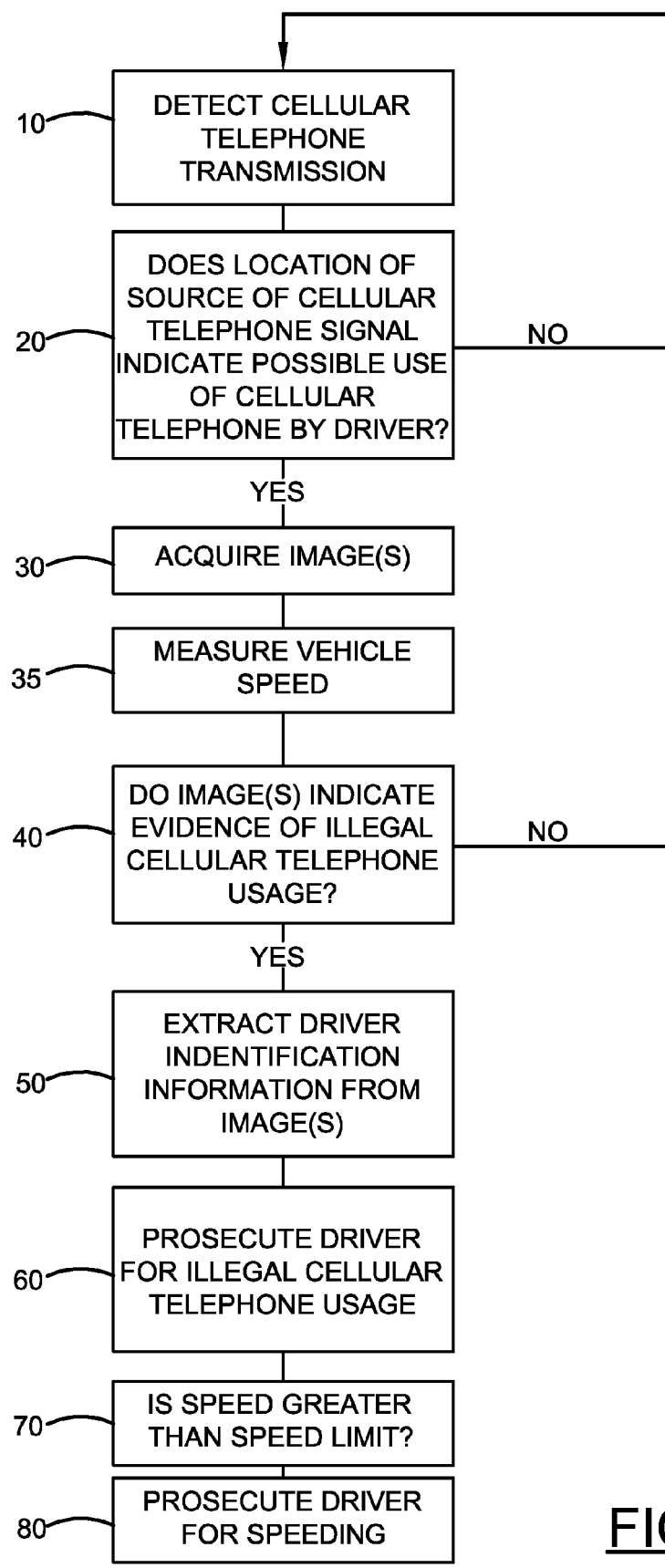
FIG. 2 is a flowchart as in FIG. 1 additionally including a sensor device operative to detect the velocity of a vehicle that is above a speed limit.

Also, it is to be understood that the example described with respect to FIG. 1 is one of many variations of the method steps that may be carried out to determine that a particular vehicle is the source of illegal mobile phone use. For example, FIG. 2 shows an alternative embodiment. Here the method comprises a step 35 of measuring the velocity of the vehicle in addition to capturing images of the vehicle. The method may include a further step 70 of determining whether a speeding violation has been committed, responsive to the velocity of the vehicle detected and the speed limit for the section of the road being monitored by the system. In addition to prosecuting the driver for illegal mobile phone usage, the method may also include at step 80 prosecuting the driver for exceeding the speed limit. Some of the same information acquired, such as license plate information, could be used for both prosecutions.

It is to be understood that in alternative embodiments, it may also be possible to perform a similar set of combined data acquisition (mobile phone usage and speeding) but to execute decision-making steps in a different order; namely, to first detect speeding violations, and then, for those vehicles for which a speeding violation is detected, examine for illegal mobile phone usage.

Figure 3:
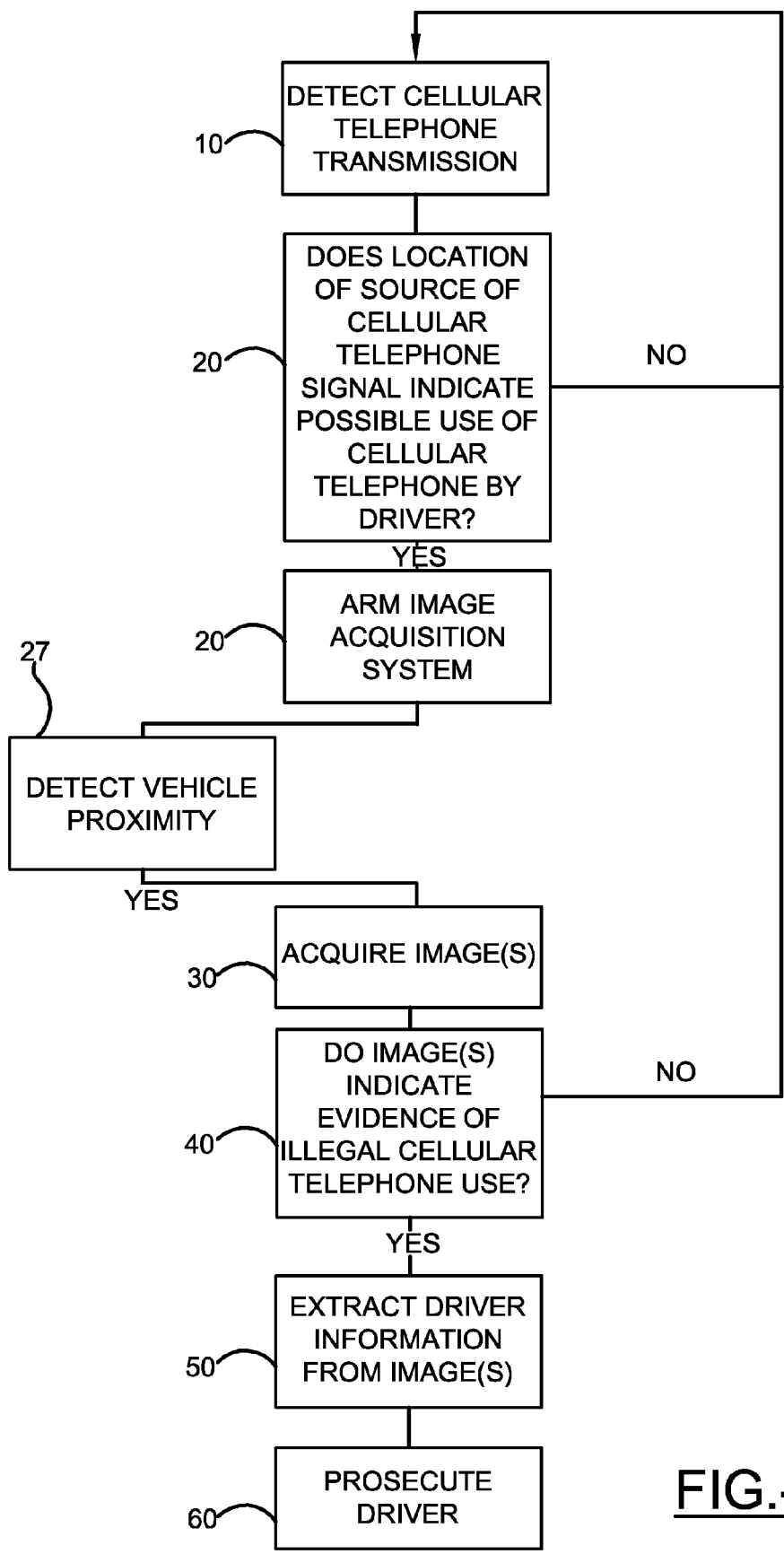
FIG. 3 is a flowchart as in FIG. 1 in which image acquisition is enabled by detection of a mobile phone transmission and is triggered by a sensor such as a vehicle presence detection device.

A further alternative embodiment of a method for detecting illegal mobile phone usage is shown in FIG. 3. It can be appreciated that the methods already described and illustrated with respect to FIGS. 1 and 2 may include many images acquired during an event that may not be useful for purposes of identifying illegal mobile phone usage. To enhance the efficiency of the system, the system may be operative to acquire images which can be used to more easily discern whether a driver is illegally holding a mobile phone while driving. As shown in FIG. 3, the method may include a further step 25 of arming the image capturing device(s) of the system, responsive to the detection of an appropriate mobile phone signal. Before image acquisition takes place, the method may include a step 27 of detecting and evaluating data from other sensor devices, such as a vehicle presence detection device to determine when the car is properly positioned for image capture. When the vehicle presence detection device indicates that the car is located in a predetermined location, the system may then trigger the step 30 of acquiring images. In this described embodiment, the predetermined location may include a location that enables one or more cameras to acquire detailed images of the driver from the front and/or side of the vehicle. The method may further comprise acquiring more than one image at least approximately simultaneously, such as one image depicting the driver and another image depicting a license plate of the vehicle (or images depicting both license plates of the vehicle).

In an embodiment where the presence detection device corresponds to an image capturing device such as a video camera, software operating in one or more computers may be operative to determine the location information for the location of the vehicle from the images acquired by the image capturing device. The location information may be used to trigger when further image capturing devices are operated to capture images of the drive of the vehicle. Also, the location information may be correlated by the system with the mobile phone signals to determine that the vehicle (the presence of which is detected and the image of which is being captured) is in (or was in) a location that corresponds to the location for the source of mobile phone signals.

Figure 4:
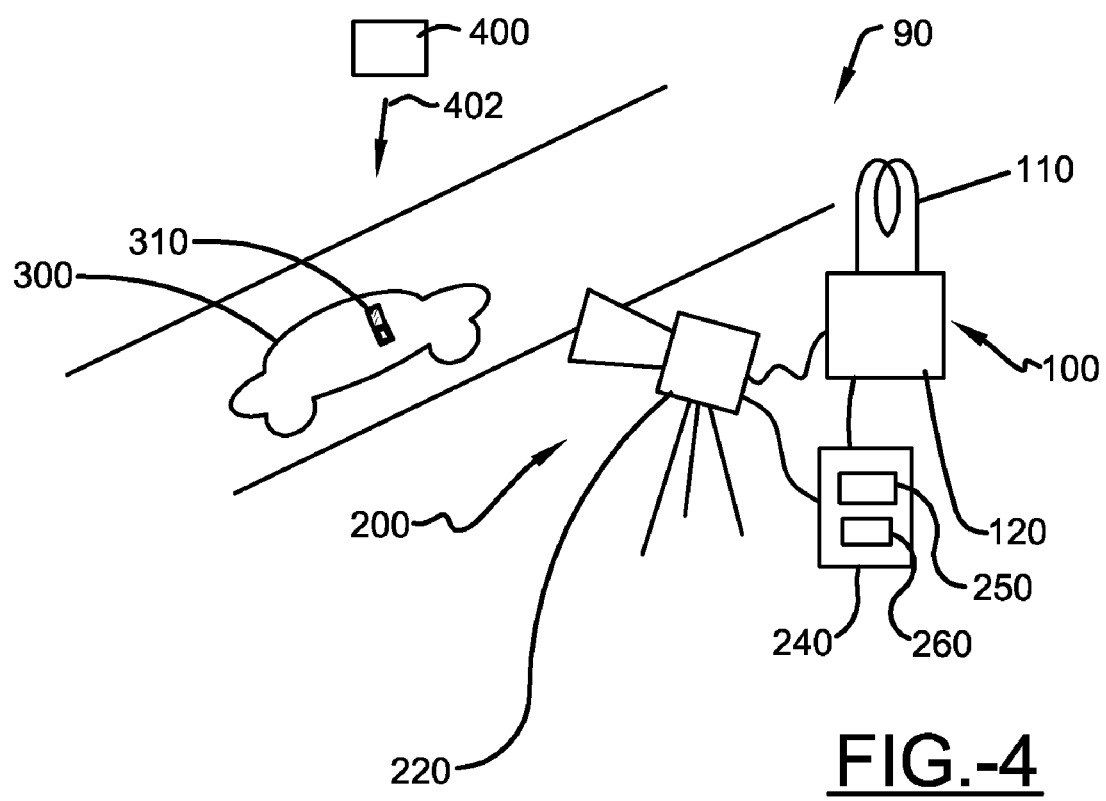
FIG. 4 illustrates an embodiment of a detection system including a mobile phone signal receiving device and an image capturing device.

An embodiment may also comprise an apparatus such as a detection system 90 suitable to perform the described method steps. Such a detection system is illustrated in FIG. 4. The detection system may comprise at least one mobile phone signal receiving device 100 which may comprise at least one antenna 110 in operative connection with at least one receiver 120. The antenna 110 may be suitable to receive signals transmitted from a mobile phone 310 such as a cellular telephone in the vehicle 300. The receiver 120 may be tuned or may comprise a filter which is capable of detecting signals whose carrier frequency corresponds to at least one typical mobile phone signal transmission. For example, for common cellular telephone technology, the carrier frequency being monitored may be chosen to be approximately 900 MHz or 1.8 GHz and/or 2.1 GHz.

The described system may use the signal strength of a signal at the selected carrier frequency, as an indicator of distance between the transmitting mobile phone 310 and receiving antenna 110. As discussed elsewhere herein, the antenna 110 may be an antenna which is only able to receive signals which are fairly strong; i.e., signals having a strength which corresponds to a typical cellular telephone transmitter being located within a known, fairly short distance from the antenna 110. Such an antenna would ordinarily be considered a poorly designed antenna, but may be appropriate for use with the described embodiments to avoid detecting mobile phone usage outside the desired detection area. Alternatively, the antenna 110 may be a better-designed antenna with better capability for receiving transmitted signals, and the received signals may be provided to receiver 120, but receiver 120 may comprise a threshold detector such that signals below a predetermined strength are ignored. Signals received by antenna 110 may then enter the receiver 120 where they can be amplified, analyzed, recorded or otherwise processed for purposes of the embodiments described herein.

An embodiment of the detection system may further comprise an image acquisition system 200 which may comprise at least one image capturing device 220. Examples of an image capturing device include a still camera, video camera, or any other device operative to capture a visual image of at least portions of the vehicle. In an exemplary embodiment, the image capturing device may include the capability of generating digital images. However, it is to be understood that the image capturing device may also be capable of producing an analog signal corresponding to the captured image or video. In such cases, the image acquiring system 200 may further include a frame grabber board, video capture board, or other image conversion device that is operative to convert analog imaging signals into digital images. However, as discussed below, such an image conversion device may be included in other elements of the detection device.

The image acquisition system and/or one or more image capturing devices may be commanded or armed to operate upon receipt of a command from receiver 120 (or a computer associated with the receiver), which command indicates that possibly illegal mobile phone transmissions are emanating from a location in or near the roadway. In exemplary embodiments, the image acquisition system 200 may comprise more than one image capturing device, for example pointed in different directions and operative to image the vehicle from different vantage points to capture pictures or video of the driver region of the vehicle and/or the front and rear license plate areas of the vehicle. For example, the system may include a first video camera orientated to capture images from the side of the driver of the vehicle, while a second video camera is orientated to capture images of the front of the vehicle, while a third video camera is orientated to capture images of the back of the vehicle. With this arrangement, the three video cameras may capture images of the driver, the rear license plate, and the front license plate (if present).

In addition, the image acquisition system may include image capturing devices operative to acquire images both from a vantage point somewhat to the left of the driver and a vantage point somewhat to the right of the driver, so as to be useful in detecting either a mobile phone held in the driver's left hand or a mobile phone held in the driver's right hand. Alternatively, an image capturing device may be oriented to acquire only one such image. For example, the image capturing device may be oriented such as to acquire an image obtained from a vantage point sufficiently close to straight in front of the driver so that the image could be used to detect the presence of a mobile phone in either hand of the driver.

In embodiments of the system, the image capturing devices may be capable of acquiring images of a vehicle with sufficient resolution to determine and document the license plate or other identifying information about the vehicle or to document in sufficient detail what, if anything, the driver is holding. Also, the image acquisition system may be capable of acquiring more than one image over time pertaining to a particular possible violation event and may be capable of acquiring more than one image from more than one vantage point over time, such as any combination of front, rear and/or side image and/or images at different angles captured over several seconds or longer.

In addition to the captured images of the vehicle, the detection system may also be operative to acquire (and store in association with the images) other desired information about when and where the image was acquired, or any other information of interest. The information about where the images were taken could come from a global positioning system which is part of the detection system. Alternatively, the information could be entered or programmed into the system at the time the system is set up or installed in a particular location. In addition, the detection may also be operative to store (in association with the images) information from or about the mobile phone signal associated with the event. For example, the stored mobile phone signal information may include determined characteristics of the mobile phone signals, such as its strength. Also, the stored mobile phone signal information may include data included in the signal such as data which identifies the mobile phone device, a telephone number, carrier, data identifying the cellular telephone towers involved in communicating with the device, and/or any other data that can be determined from the mobile phone signal.

Mobile phone signals may include an encrypted portion. Some embodiments of the system may be operative to decrypt the signals and/or may be operative to communicate with servers which are operative to decrypt the signal and return decrypted data included in the mobile phone signal. In embodiments of the system that do not have the ability to determine the content of encrypted portions of the mobile phone signal, the system may still be operative to store a copy of the signal. Such a stored copy of the mobile phone signal for an event may be made available for use in prosecuting a person for illegal use of a mobile phone. At the time of the prosecution, the stored mobile phone signal may be retrieved from the data store and decrypted by the entity (e.g., mobile phone service) responsible for establishing the encrypted communication with the mobile phone.

During prosecution of an offender, the system may be operative to carry out or assist in carrying out correlation of the information about where and when the mobile phone signal was detected by the detection system, with information in the offender's mobile phone signal. In addition, the system may be capable of interfacing with mobile phone services to retrieve records corresponding to the particular telephone call carried out with the detected mobile phone signals. Such records may include further details of the call, such as the telephone numbers involved, the duration of the call, global positioning information associated with the location of the mobile phone at the time of the call, and/or any other information stored by the mobile phone service which facilitated the mobile phone call for the mobile phone detected by the system.

In embodiments in which the system is not capable of automatically interfacing with a mobile phone service to retrieve such telephone call records, the system may be operative to output information for law enforcement which may be used to request the relevant telephone call records from the appropriate mobile phone network.

In an embodiment, the system may further comprise a timer or clock whose time information is associated with the other information acquired. This time information may be incorporated into the images. The system may further associate or stamp acquired images with information about where the images were taken. The system may also be operative to digitally sign and/or digitally time stamp images and/or other acquired data regarding an event.

As shown in FIG. 4, the detection system 90 may further comprise at least one storage system 240 (i.e., a data store) capable of storing the mobile phone signals, images, and other acquired information for an event. Such a storage system may include a computer 250 and one or more storage devices 260 such as a hard drive, flash memory drive, tape system, or any other device capable of storing the acquired information for an event. Also, all or portions of the data for each event may be stored in one or more records of a data store such as a database managed by the computer and stored on the storage device or stored in a remote server in operative connection with the computer.

The computer associated with the described storage system may also be operative to control operation of portions of the image acquisition system 200, such as the image capturing devices 220. The computer of the storage system may further be operative to control operation of the receivers 120. However, it is to be understood that the detection system may include a computer that is physically separate from the storage system 240, which computer is operative to interface and control the one or more of the components of the described detection system.

Figure 5:
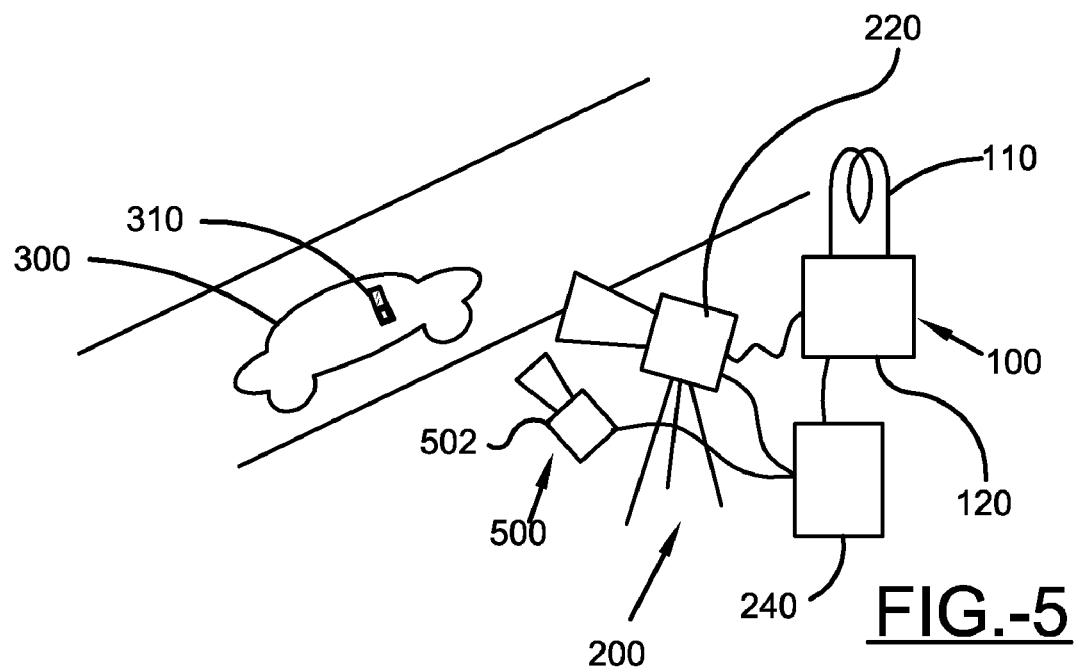
FIG. 5 illustrates the detection system of FIG. 4, further including a sensor device for measuring the speed of the vehicle.

As discussed previously, in addition to capturing images of the vehicle associated with mobile phone signals, the system may include one or more sensor devices operative to acquire other features of the vehicle. For example, as shown in FIG. 5, the system may include a sensor device 500 in the form of a vehicle velocity measuring device 502. Another example of sensor devices which the system may include is a vehicle presence detection device such as motion detection devices, proximity detection devices, vehicle position sensing devices, and/or one or more image capturing devices. Also, it is to be understood that the system may include any other type of sensor device capable of capturing data regarding the location, speed, identity, or any other information which may be useful for correlating a mobile phone signal with a particular vehicle and/or which may be useful with prosecuting an offender. As discussed previously, information acquired from such sensor devices 500 may be stored for the event by the storage system 240.

Figure 6:
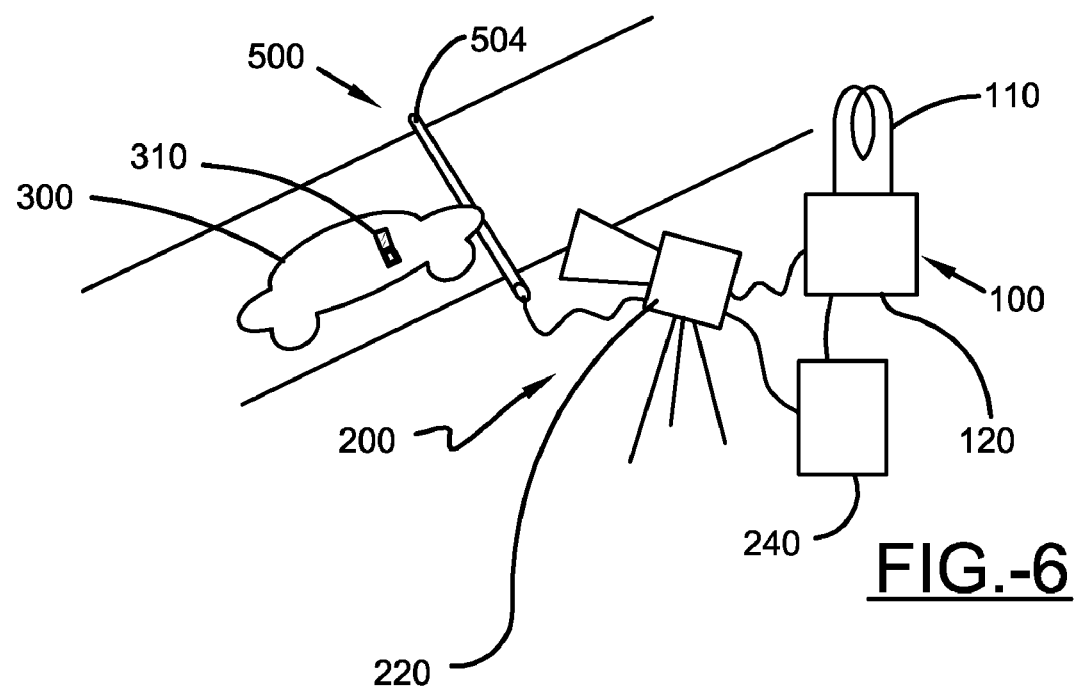
FIG. 6 illustrates the detection system of FIG. 4 in which signal detection enables or arms the system and a trigger causes image acquisition.

As discussed previously, an embodiment may further be operative to enable or arm the triggering of the image acquisition system. This further variation of the detection system is illustrated in FIG. 6. In this example, receipt of a mobile phone signal transmission by the receiver 120 would enable or arm the image acquisition system 200. FIG. 6 shows the addition of a sensor device 500 that is operative to trigger acquisition of images by the image acquisition system after the acquisition of images has been enabled or armed. Here, the sensor device 500 may be in the form of a vehicle presence detection device 504. Such a vehicle presence detection device may include a sensor strung across the roadway which registers when the force of a vehicle's tire is exerted thereon, or could be a sensor which detects the presence of a vehicle by the breaking of a beam of light, or it could be a sensor which detects the metal of a vehicle, or it could be a sensor which detects changes in capacitance caused by the vehicle, or it could be any other appropriate type of sensor operative to detect the presence or position of the vehicle. Also, as discussed previously, the sensor could correspond to an image capturing device such as a video camera. Output from this sensor could serve as a trigger for image acquisition by the image acquisition system of images of the drive, license plate, or other portions of the vehicle. Image acquisition could occur or begin either immediately upon receipt of a trigger from such a sensor device 504, or could occur or begin after a known time delay after receipt of a trigger from such a sensor device 504.

In a further embodiment, the system may continually acquire video images from each image capturing device which are stored in a respective buffer in a frame grabber and/or in the storage system 240. The buffer may be repeatedly overwritten with newly captured images. However, responsive to the detection of the vehicle by the sensor device 500, and/or responsive to the detection of a mobile phone signal by the signal receiving device 100, the system may be operative to begin storing portions of the buffer in a storage location outside the buffer. In an embodiment, the system may be configurable to enable selection of which images before and/or after a triggering event that should be copied and saved from the buffer. For example, upon detection of the presence of the vehicle and/or the presence of a mobile phone signal, the system may be operative to save from the buffer a pre-selected number of video frames both before and after the triggered event to a portion of the storage system 240. Also, rather than or in addition to selecting the number of frames, the system may be configurable to set the time duration before and/or after a triggered event to save frames from the buffer. The saved images may be stored in the storage system in association with any other data captured for the event.

In a further embodiment, image recording could be done on a continuous basis, and all of the images could be stored or retained. The receipt of a signal from a mobile phone or any other triggering device could cause the detection system to flag the relevant images by storing the time of the detection in the storage device. The system may alert or at least report to law enforcement that triggering events have occurred which may correspond to illegal mobile phone usage. The appropriate portions of the stored video corresponding to the times recorded by the system for an event may later be reviewed by law enforcement personnel to determine if an illegal mobile phone usage can be prosecuted. Also, it is to be understood that in some embodiments, one or more of the described image capturing devices may be used by the system to carry out one or more of the previously described functions of the sensor devices 500.

In some embodiments, it is further possible that the detection system may generate reports which are relevant to use of the equipment in an unattended manner. In some embodiments, the detection system may report back to a remote server at a monitoring station (which may be a police facility or other location) any occurrence of possible illegal mobile phone usage and the associated images captured by the system. In some embodiments, the detection system may report back when its capacity for acquiring images is full or nearly full. In some embodiments, the detection system may store its acquired images and other information internally and/or may communicate such information to a remote server, either wirelessly or through wires, either at the time of acquisition of such information or upon the command to transmit such information. In embodiments, the detection system may transmit, either continuously or upon query, information about the status of the detection system. In embodiments, the detection system may comprise a display or lights suitable to display information about the status of the detection system. The detection system may comprise keypads, pointer devices or similar input features. The detection system may comprise an image display suitable to display acquired images. The detection system may comprise interfaces for connecting other systems such as for downloading acquired images and information from the detection system, or for loading instructions into the detection system.

Figure 7:
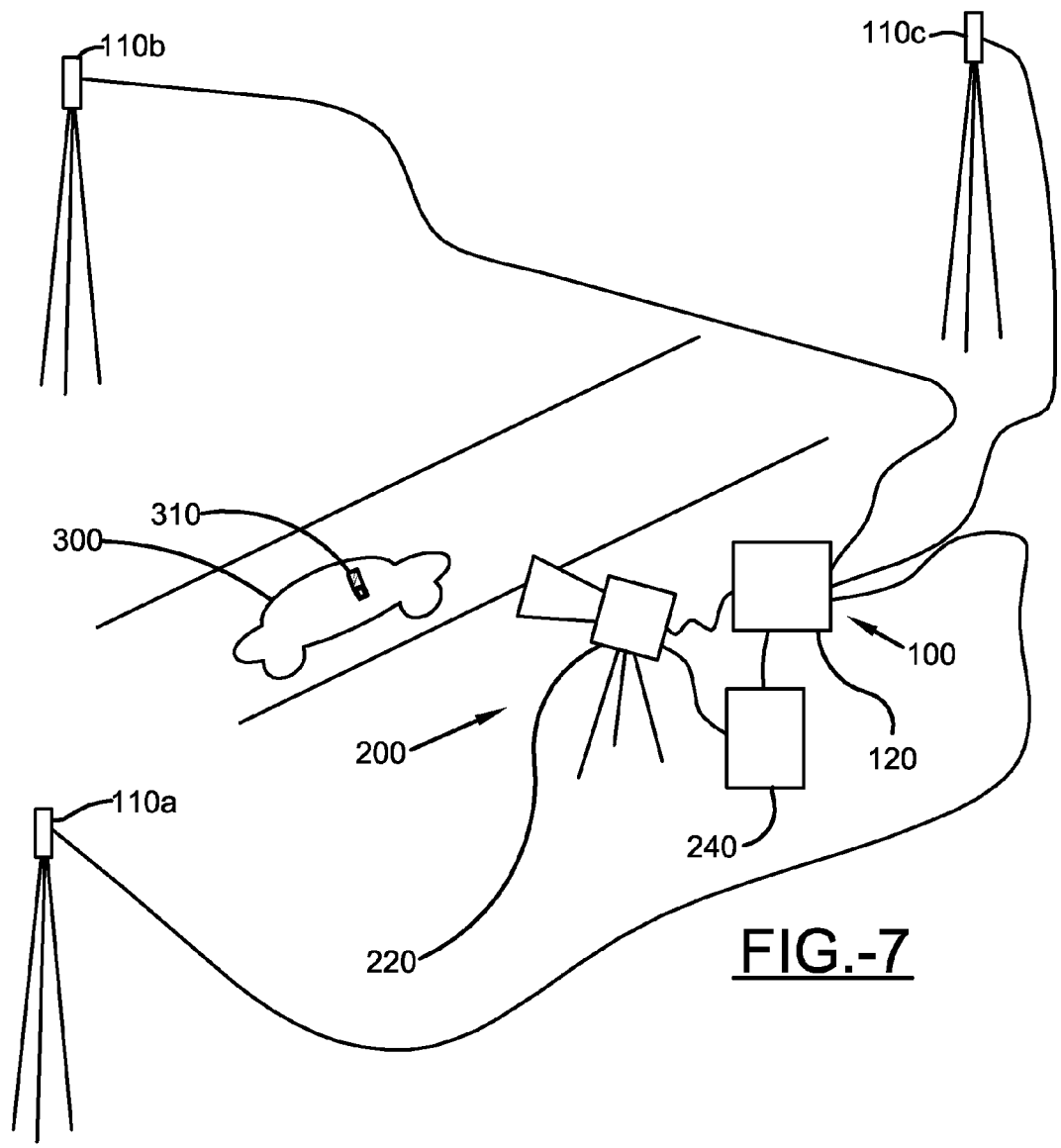
FIG. 7 illustrates a detection system which uses triangulation involving multiple antennas.

FIG. 7 illustrates a further embodiment of the system. In general, location of a transmitter can be determined by triangulation if a signal is transmitted from one location to three or more receivers at known locations (or, for signal transmission in the opposite direction, if a signal is transmitted to one location from three or more transmitters at known locations). Frequently a cellular mobile phone may be in contact with more than one cellular receiver such as a cellular telephone tower. The arrival times of signals at each of the receivers could be used to determine the position of the transmitting mobile phone, and then to determine whether the transmitting mobile phone is or is likely to be within the physical bounds of a roadway. The relative signal strengths may also enter into such a determination. FIG. 7 illustrates that three antennas 110a, 110b and 110c may be connected to one or more receivers 120. Signals from the three antennas may be used by the detection system to determine that the location from which mobile phone signal transmission is emanating corresponds to the portion of the roadway being monitored by the system. Other aspects of this embodiment can be carried out as described elsewhere herein. In a further embodiment, two antennas may provide some information about possible locations of a mobile phone signal transmission, especially if there are only a limited number of roads or likely locations. Also, changes over to time, in the signal strength or other characteristics of the received signal, can be interpreted to indicate whether the source of the signals is moving and is likely located in the roadway being monitored.

As shown in FIG. 4, in a further embodiment, the system may include a transmitter device 400 capable of communicating the presence of the jurisdiction in which mobile phone usage while driving is prohibited. The transmitter device may be positioned to continuously broadcast a warning signal 402 near the described system or elsewhere in the jurisdiction, such as adjacent a major road entering the jurisdiction. Such a warning signal may include a warning message. In an embodiment, the warning signal may be capable of interrupting an ongoing mobile phone call and cause the mobile phone device to output the warning message. An example warning message may include the verbal output of "Mobile phone usage while driving in this city is prohibited" or other suitable warning.

In an embodiment, the system may be operative to detect or determine the mobile phone number associated with the detected mobile phone signal. Using this determined number, the system may be operative to contact the mobile phone and communicate the warning either verbally or through a text message or other communication feature of the device.

In an alternative embodiment, the mobile phone may be adapted to include the capability of monitoring for warning signals. For example, manufacturers of mobile phones may include in the phone a sensor operative to detect a standardized warning signal and responsive thereto to emit an audible warning sound or verbal message.

In an alternative embodiment, rather than providing a warning, the system may contact the determined mobile phone number and communicate information regarding the violation of the law. For example, the system may communicate the message "Use of this mobile phone device was detected while moving in a vehicle. The license plate of the vehicle has been photographed and the owner of the vehicle may be cited upon further review by law enforcement." Also in further alternative embodiments, the message communicated to the mobile phone may include details regarding the fine and/or need for a court appearance. Further, the message may include a telephone number, address or web site which can be contacted for purposes of verifying that the car has been ticketed and/or for use with paying the fine associated with the violation.

The previously described image capturing devices may include still or video cameras operative to capture images of visible light. However, it is to be understood that the image capturing devices may also include cameras or other devices operative to capture non-visible light such as infrared radiation.

In an alternative embodiment, infrared cameras may capture images of the vehicle which show the location of warm objects inside the vehicle, such as people. If only one warm object is detected in the vehicle, the system may be operative to determine and/or indicate that the vehicle includes only one occupant that is both driving the vehicle and using a mobile phone. Such a determination can be made using an infrared camera in cases such as at night when it is too dark to capture images of the occupants of the vehicle with a visible light camera. Also, in cases where the driver is using a hands-free mobile phone, an infrared camera determination of only a single occupant in the vehicle can be used by the system to indicate likely illegal use of a mobile phone by the driver of the car.

In addition, as discussed below in more detail, infrared image capturing devices may be used to capture the interior detail of a vehicle, which details may not be visible using visible light image capturing devices. For example, in order to acquire interior images of a vehicle, the image acquisition system may be capable of overcoming windshield glare which tends to obscure or hide the driver of the vehicle. When light strikes a transparent surface, part of the light is transmitted through the surface, part of the light is reflected, and part is absorbed by the material. The amount of light reflected at the surface is highly dependent on the angle of incidence. Reflection of light may be specular (that is, minor-like) or diffuse (that is, not retaining the image, only the energy), depending on the nature of the interface. Glare can be defined as the contrast-lowering effect of stray light in a visual scene. Such stray light may come from direct or reflected sunlight or artificial light such as car headlamps and street lamps.

The windshield of a vehicle must transmit 70 percent of light in the visible spectrum according to the Federal Motor Vehicle Safety Standards Part 571.205. A dirty windshield can transmit much less light and/or reflects more light than a clean one, thereby creating more glare in an image of the outside of the windshield captured by a camera. Light reflecting off of the windshield can produce a specular reflection or a diffuse reflection, depending on the light source. On a sunny day, a specular reflection from the sun can happen if the sun is directly overhead. This results in a direct reflection of the sun on the windshield creating an intense glare. On a cloudy day, the sun's rays are dispersed through the clouds giving a diffuse reflection. This results in the windshield appearing white to the observer.

Figure 8:
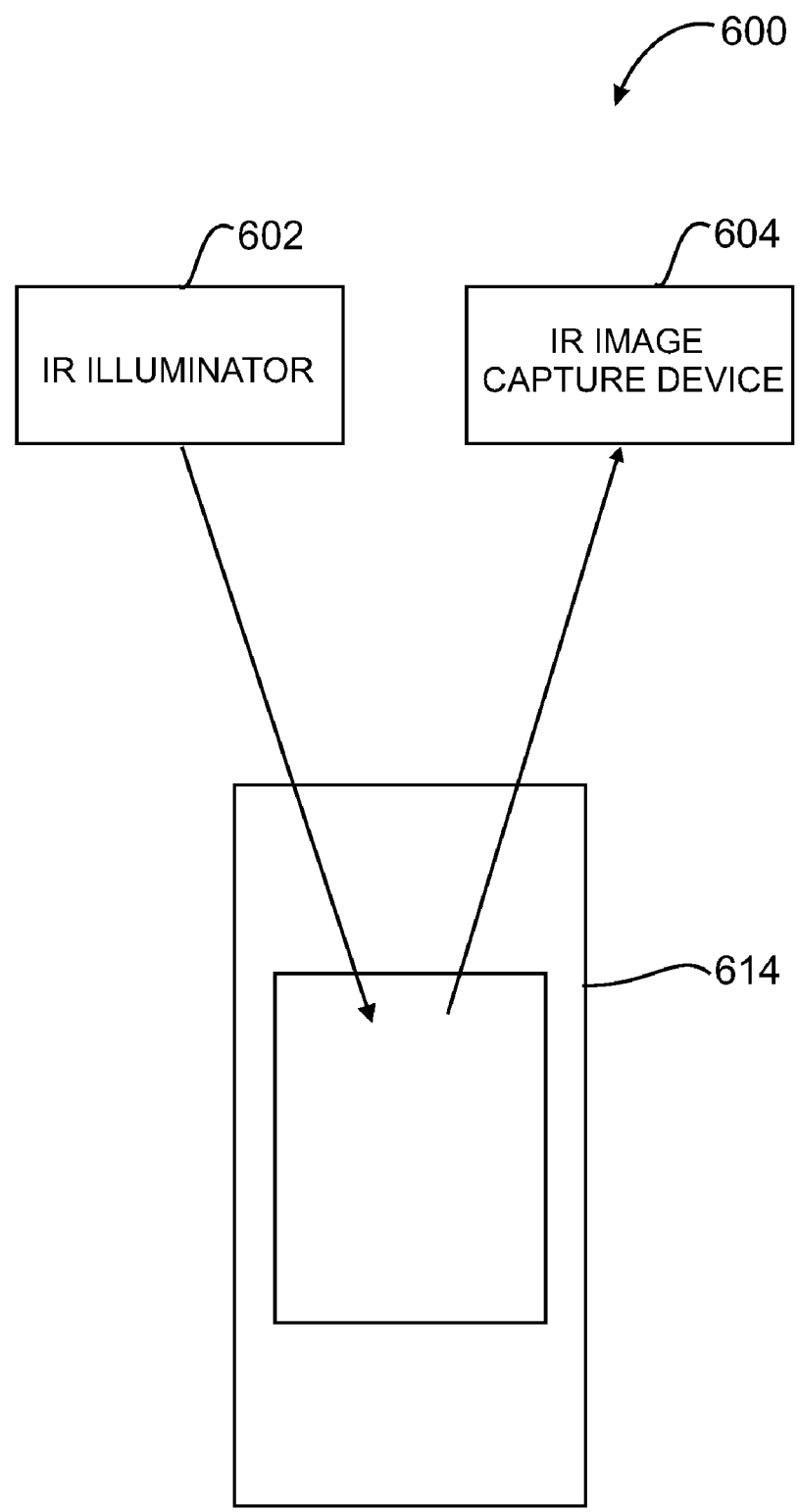
FIGS. 8 and 9 illustrate an example detection system that includes an infrared illumination device.

To remove and/or reduce the glare and/or remove shadows from the interior of the vehicle in images, one or more of the previously described embodiments of the image acquisition system 200 may use infrared light to illuminate a vehicle. An example of an image acquisition system 600 that uses infrared light to illuminate a vehicle 614 is shown in FIG. 8. Here the image acquisition system 600 may include an infrared illuminator 602 that emits infrared light in a wavelength that is invisible to the human eye, but is detectable by a CCD or other type of sensor of an image capturing device 604. For example, an infrared illuminator may output infrared light at wavelengths above 760 nanometers.

Examples of devices capable of emitting infrared light include light emitting diodes (LEDs), halogen lamps and diode lasers. However, not all of these technologies may be capable of outputting infrared light with sufficient power to illuminate a vehicle at a distance. Thus, in exemplary embodiments, the particular infrared illuminator chosen should be capable of outputting a sufficient amount of infrared light to illuminate at least portions of vehicle from a position of at least 20 feet from the vehicle.

An example of a commercially available infrared illuminator that may be used in embodiments of the image acquisition system 600 includes an ALS-40 infrared illuminator of Electrophysics Corp. The ALS-40 infrared illuminator uses a 40 watt diode laser to produce coherent light at 810(±2) nanometers. This wavelength is invisible to the naked eye except for a faint red glow at the front of the illuminator. Infrared illuminators of this type are available with a beam angle of 10°-80° in increments of 5° both in the horizontal and vertical directions. An ALS-40 with a beam angle of 20° was used to capture the images show in FIGS. 11 and 13-15 described in more detail below.

Infrared illuminators used in example embodiments may have an optical system capable of spreading the initial diode laser beam out so that the power density is below the maximum permissible exposure according to the standards of the Center for Devices and Radiological Health of the United States Food and Drug administration (21 C.F.R. Sec. 1040) and the requirements of the International Electrotechnical Commission (IEC-60825-1). Under these standards the example ALS-40 infrared illuminator is classified as a Class 1 Laser Device which presents no danger of eye damage in the manner used in the examples described herein. Examples of optical systems which may be used in an example infrared illuminator 602 are shown in U.S. Pat. No. 6,442,713, which in hereby incorporated by reference herein in its entirety.

As shown in FIG. 8, the example image acquisition system 600 may include an image capturing device 604 (e.g., digital still or video camera) having high resolution, low light sensitivity, and spectral response in the infrared region of the electromagnetic spectrum. Commercial examples of infrared cameras capable of being used for the described image capturing device 604 may include a Sentec STC-400HOL camera and an ImagingSource DMK21AU04 camera. These cameras have different features and employ different CCD chips. The Sentec STC-400HOL is a monochrome camera utilizing a Sony ½" interline CCD. The resolution is 570×485 TV lines. The camera shutter speed can be adjusted manually from ⅟₆₀ to ⅟₁₀,₀₀₀ by setting the DIP switches on the camera board. The analog video signal is outputted through a BNC connection. The ImagingSource DMK21AU04 is a USB monochrome camera which uses a Sony ¼" progressive scan CCD. It has a 640×480 pixel resolution and is capable of taking up to 60 images per second. This camera has automatic adjustments for shutter speed, gain and offset.

In example embodiments, the image capturing device 604 must also include a lens with a focal length appropriate for the intended spacing between the image capturing device and the portion of a street/highway for which images of vehicles will be captured. For example, a 12 mm lens may be used to give a 10'×10' field of view at about 45 feet away. This field of view approximately corresponds to one street lane wide. However, it is to be understood that in other spatial arrangements, image capturing devices with lenses in other focal lengths may be used.

In example embodiments, the image capturing device may employ a filter to block part of the incoming light from hitting the CCD sensor of the camera. For working within the infrared region of the electromagnetic spectrum, the visible part of the light spectrum may be blocked. The previously described Sentec STC-400HOL camera is equipped with a longpass filter which blocks light below 805 nm installed between the camera sensor and the lens. For cameras that do not include a built-in filter, such cameras may be fitted with a filter that corresponds to the wavelength range produced by the infrared illuminator 602. For example, for use with the ImagingSource DMK21AU04 camera, a narrow band pass filter (NBP-810-10-45) from Infrared Optical Products centered at 810 nm may be used. Such a filter has a center wavelength of 809.6 nm and a full width half maximum of 10.6 nm, which approximately matches the type of output from the ALS-40 illuminator.

Figure 9:
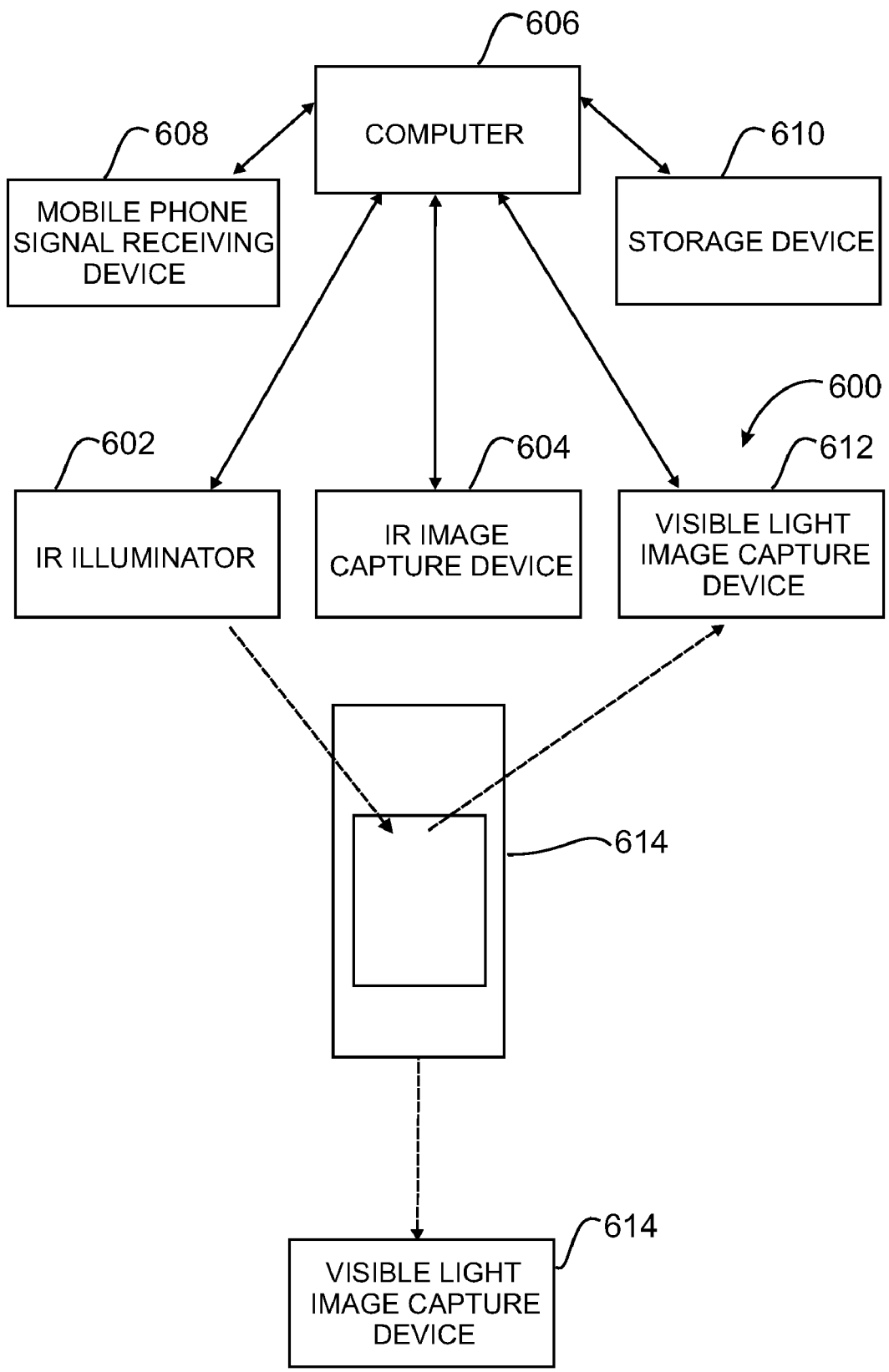

FIG. 9, shows an example of the previously described detection system which employs an image acquisition system 600 having an infrared illuminator 602. As discussed in previous embodiments, the image capturing device 604 may be in operative connection with a computer 606 (which comprises at least one processor). Also as discussed previously, the at least one computer may be in operative connection with a mobile phone signal receiving device 608 and at least one local or remote storage device 610 (i.e., a data store). The at least one computer may be operative to control the image capturing device to acquire images which are stored in the at least one storage device. The least one computer may also enable the images to be reviewed (e.g., accessed locally or communicated to a remote server) for purposes of determining whether a person associated with the vehicle should be prosecuted for illegal use of a mobile phone while driving the vehicle.

Also, as discussed with respect to previously described embodiments, the example image acquisition system 600 may include more than one image capturing device of one or more different types. For example, the image acquisition system 600 may employ at least one image capturing device 604 in the form of a camera adapted to capture infrared light illuminated onto/into a vehicle 614 via an infrared illumination device 602. Also, the image acquisition system may employ at least one visible light image capturing device 612 adapted to capture visible light (e.g., light from the sun or other light source) reflected from the car and/or driver. In some embodiments, the infrared camera and the visible light camera may be positioned to capture images of the car at about the same time and from similar vantage points. Such a vantage point may be chosen so as to maximize the visibility in captured images of a driver holding a mobile phone inside a typical range of sizes and shapes of vehicles. Also, visible and/or infrared light image capturing devices 614 may be positioned to capture images of the license plate of the vehicle and/or other views of the vehicle and/or driver. However, it is to be understood that alternative embodiments may include one or more visible and/or infrared image capturing devices positions are similar and/or different vantage points. Also, it is to be understood that one or more image capturing devices and/or one or more infrared illuminator may be triggered to capture/store images and/or output infrared light respectively, responsive to one or more triggering events. Such triggering events may include the detection of a mobile phone signal with the mobile phone signal receiving device, as discussed previously. Such triggering events could also be the detection of the presence of a vehicle via the vehicle presence detection device, as discussed previously.

Figure 10:
FIGS. 10-15 illustrate digital images captured with and without infrared illumination devices.
Figure 11:

FIGS. 10-14 show examples of images captured using an embodiment of the image acquisition system 600. FIGS. 10 and 11 were taken on a cloudy day with an ImagingSource DMK21AU04 camera serving as the image capturing device 604 and with the ALS-400 serving as the infrared illuminator 602. No infrared illumination was used to capture the image shown in FIG. 10. As a result, the image of the windshield appears white due to the diffuse sunlight. In FIG. 11, with the same diffuse sunlight as FIG. 10, the infrared illuminator was used to illuminate the vehicle during the capture of the image with the ImagingSource DMK21AU04 camera. In FIG. 11 the diffuse glare shown in FIG. 10 has been reduced, which enables the interior of the car to be visible.

Figure 12:
Figure 13:

FIGS. 12 and 13 were taken during a break in the cloud cover with the ImagingSource DMK21AU04 camera. No infrared illumination was used to capture the image shown in FIG. 12. As a result, glare on the windshield significantly reduced the interior details of the vehicle captured by the camera. In FIG. 11 the infrared illuminator was used to illuminate the vehicle. In FIG. 11 the glare shown in FIG. 12 has been reduced, which enables more visible details in the interior of the car to be visible.

Figure 14:
Figure 15:

FIGS. 14 and 15 were taken at night at a distance of 20 feet with the Sentec STC-400HOL camera with a zoom lens. Both images were taken with the infrared illuminator directed to illuminate the vehicle with infrared light. In FIG. 14 the headlights of the vehicle are off. The resulting image shows interior details of the vehicle. In FIG. 15 the headlights of the vehicle are on. Although the visibility inside the vehicle is reduced with the headlights on (compared to FIG. 14), many interior details inside the vehicle are still visible.

In addition to using visible and/or infrared image capturing devices to determine information about the occupants of a vehicle, in alternative embodiments other types of sensors or radiation receiving devices may be used. For example, an ultrasonic detector may direct an ultrasonic signal into the vehicle. Features of the reflected ultrasonic signal may be used to determine characteristics of the inside of the vehicle.

In further embodiments, characteristics of the inside of the vehicle gathered from visible light cameras, infrared cameras, or other types of detectors such as ultrasonic detectors may be evaluated by an expert system, image analysis software, neural network, or other artificial intelligence system. As used herein, an artificial intelligence system corresponds to any device, software or system capable of determining useful information from data captured by the described detection system. Such an artificial intelligence system may be implemented as a software program in the previously described computer and/or may be implemented in a remote server operative to receive information from the described detection system. The artificial intelligence system may be operative to determine from the various types of images and other signals captured for the vehicle, whether the vehicle includes one or more occupants, and which one of the occupants is likely using a mobile phone. The artificial intelligence system may include image analysis software that is operative to determine the kind, type, and/or model of cell phone being used. The artificial intelligence system may also include facial recognition software operative to identify features of faces in the vehicle. Such identified facial features may be used to determine identities of the occupants of the vehicle via use of a database of correlated facial features and person identities. For example, the artificial intelligence system may be operative to determine whether a particular person of interest (e.g., a wanted criminal) is present in the vehicle.

In addition, the artificial intelligence system may include software operative to determine the make and model of the vehicle, and/or other characteristics such as color and the type of vehicle (truck, car, bus, etc). In addition, the artificial intelligence system may include software operative to determine information about the occupants of the vehicle, such as the number of occupants, their genders, sizes, hair color, hair styles, clothing, or any other information that can be used to distinguish one person from another person.

In further examples, such an artificial intelligence system may include software operative to determine if other violations of the law are being committed. For example, the artificial intelligence system may be operative to determine if a seat belt is being used by one or more occupants. Also for example, the artificial intelligence system may be operative to determine if a baby carrier or child seat is present in the vehicle, and if a baby or child is presently in the baby carrier or child seat. Further, the artificial intelligence system may be operative to determine whether the baby carrier or child seat is facing in the wrong direction and/or is illegally mounted in the front of the vehicle. Further, the artificial intelligence system may be operative to determine if a baby or small child is present in the vehicle but is not sitting in a baby carrier or child seat. In addition, some jurisdictions may prohibit an adult from smoking in a vehicle while a baby or child is also in the vehicle. Determination of possible illegal activities may be reported by the system to law enforcement or other persons capable of issuing citations to persons associated with the vehicle.

In embodiments of the described system, the image capturing devices may be operative to capture multiple images of a vehicle as it moves along a road. For example, the image capturing devices may be capable of capturing multiple images per second. Each image may show the vehicle in an offset position and/or with a change in size, depending on the direction of travel of the vehicle with respect to the location of the camera.

These images may be evaluated by at least one computer in the system to estimate the velocity of the vehicle. The at least one computer may include image evaluation software capable of detecting and quantifying changes in the size and/or location of the vehicle captured in a set of images. Using known information, such as the time each image was captured and the relative geometric positions between the cameras and the moving vehicle, the software may be configured to determine an estimate for the velocity of the vehicle.

For example, an image capturing device may be positioned to capture images of the license plate of a moving vehicle. License plates typically have a rectangular shape with a width and height that can be readily measured by software analyzing the images. License plates also include numbers and/or letters with sizes that can be readily measured from the captured images. An example embodiment of the software may be operative to compare the measured widths of identifiable features (e.g., plates, letters, numbers, and/or the vehicle itself) in the images to determine a change in size of one or more features from one image to the next image in time. Velocity of the vehicle may be determined based on the change in size of the measured feature and the amount of time that has passed between the images.

Embodiments of the system may also include an initial setup procedure to configure the software to accurately measure velocity given the particular arrangement of the system. Such a setup procedure may include the input of the relative locations and/or optical features of the one or more image capturing devices. Such a setup procedure may involve operating the system with one or more test vehicles moving at known velocities for purposes of calibrating/configuring the system to calculate velocity accurately from images.

In addition, features on the vehicle captured in the images, such as the lettering on license plates, may have known sizes. Such known sizes may be stored in or accessed by the software for use with calculating velocity of the vehicle captured in the images. Alternative embodiments of the image evaluation software may use the known sizes of different letters and numbers or other features of the vehicle to automatically determine velocity from the images without having the system undergo a manual calibration setup procedure with respect to measuring velocity.

In systems with multiple image capturing devices (capturing different views of the vehicle), each of the different views of the moving vehicle may be used by the system to estimate the velocity of the vehicle. The determined velocity of the vehicle may correspond to an average of the velocity measurements for the different views. Also, discrepancies between velocities associated with different views, may be used by the system to gauge the accuracy of the measurements.

As discussed previously with respect to FIG. 2, embodiments may include the system carrying out a step of determining if a speeding violation has been committed responsive to the velocity of the vehicle estimated by the system and the speed limit for the section of the road being monitored by the system. This determination can be used by the system to trigger and/or enable the prosecution of the driver for exceeding the speed limit, whether or not illegal use of a mobile phone is detected for the same vehicle.

As discussed previously, example embodiments of the described system may include components (such as image capturing devices) mounted adjacent to (or in visual range with respect to) a roadway through which vehicles travel. However, it is to be understood that alternative embodiments may be mounted in other predetermined locations at which it may be desirable determine whether mobile phone communications are taking place. Such other locations may include border crossings, casinos, buildings, prisons, hospitals, airplanes, trucks, cars, construction equipment, and other types of buildings, vehicles, and geographical locations. An example of an alternative embodiment of a detection system operative to detect mobile phone signal originating from a predetermined location (e.g. a vehicle and a prison) and operative to communicate the detection (and the predetermined location of the detection) to a remote monitoring system, is found in U.S. application Ser. No. 12/433,219 filed Apr. 30, 2009.

In some of these alternative embodiments, image capturing devices may not be used (or needed) to determine that a mobile phone signal is originating from a predetermined location. For example, in an alternative embodiment, mounted inside a vehicle, or a room in a building (e.g., prison cell), a mobile phone signal receiving device may be configured with one or more antennas operative to provide sufficient information for a computer system in the vehicle or building to verify that a particular detected mobile phone signal is originating from inside the vehicle or room in the building (and not outside the vehicle or room). In this example, the predetermined location corresponds to the interior of the vehicle or the room of the vehicle. Upon determination that the mobile phone signal is originating from the predetermined location, the detection system is operatively configured to notify a remote server that a mobile phone signal was generated in the predetermined location.

In the case of a vehicle (or other predetermined location), the detection system may include a wireless network interface device that connects to a wireless network in order to communicate with the remote server. The remote server may then be operative to notify (via SMS messages, database logs, e-mail, web interface, or other electronic communication) a further person or entity of the detection of the mobile phone signal and usage in the particular predetermined location.

This described alternative example system may be used by employers, parents, or other parties, to receive electronic notice when a person is using a cell phone (in violation of a company or parent rule against such use) in a particular vehicle. As described in more detail in U.S. application Ser. No. 12/433,219, the system mounted in the vehicle, may be operative to detect when the vehicle is moving and the velocity at which the vehicle is moving. Such information regarding velocity in U.S. application Ser. No. 12/433,219 was described as being used to determine when to emit a jamming signal with a jamming signal transmitting device in order to disrupt the cell phone signal in different ways depending on predetermined velocity ranges. However, in the described alternative example system, in place of (or in addition to) emitting a jamming signal, the system may be configured to notify the remote server of mobile phone usage in the vehicle based on the particular speed of the vehicle. For example, the detection system may include one or more configurable velocity thresholds stored in a memory of the system. For example, when the vehicle is determined by the system to not be moving, the system may be configured to not notify the remote system of cell phone usage in the vehicle. However, when the velocity of the vehicle is detected by the system to be greater than zero, or some other configurable velocity, the system may be configured to notify the remote server of mobile phone usage while the vehicle is moving at and/or is above such some configurable velocity threshold.

In this described embodiment, the system may include a wireless network interface device capable of communicating with the remote server through a cell phone based network. In a further alternative embodiment, the detection system may include an 802.11a, b, g, n wireless network interface device configured to communicate with a wireless access point rather than a device which communicates with cell towers. In addition, in another embodiment, the detection system may include a Bluetooth (or other short range communication signal) based network interface device that is operative to be configured to communicate with the remote server through the wireless network capabilities of the mobile phone being detected (e.g. via tethering).

In these embodiments, the detection system may store in a local data store, event data regarding the detection of one or more communication uses of the mobile phone in the vehicle. Such event data may include all or portions of each communication, the date, time, and duration of each communication, the velocity of the vehicle and/or the location of the vehicle during the detected communication (determined through a GPS device included in the system) and any other data associated with the detection of the mobile phone signal and/or the operation of the vehicle during the detection. The system may continually or periodically transmit at least portions of such collected data regarding mobile phone use events to the remote server. Also for systems that do not include a continuous wireless connection with the remote server (e.g., systems using a 802.11a, b, g, n type wireless network interface device), when the vehicle passes near a compatible wireless network in a home garage, parking lot, or other location, the system may be operative to automatically detect the network and begin communicating detected events held in the data store to the remote server. In addition, the system may be operative to wait until a request is received from the remote server through the detected wireless network prior to sending the data stored in the local data store to the remote server.

In this described embodiment of a detection system mounted in a vehicle, the system may be operative to record in the data store, all or at least a portion of the wireless communications (voice and/or data) transmitted from the detected mobile phone (which as discussed previously may include any type of communication device operative to communicate wirelessly from the vehicle). In addition, an alternative embodiment may be operative to automatically detect which wireless signals are being received by the mobile phone in the vehicle and to record all or at least a portion of these received communications as well in the data store.

The storage (and/or the reporting to the remote server) of such data regarding the detected communications may occur for all detected communications or may be triggered based on the detected velocity of the vehicle surpassing a configurable threshold stored in the system. However, alternative embodiments may also be operative to trigger the storage (and/or the reporting) of such data regarding a detected communication on other events such as the time of day, a schedule, the frequency band of the communication, the type of communication (e.g. voice or data), or any other information regarding the use of the mobile phone, the operation of the vehicle, or any other data accessible to the detection system inside the vehicle.

As discussed previously, embodiments of the detection system may correspond to a device mounted in the vehicle that is operative to directly detect mobile phone signals originating from mobile phones inside the vehicle (via an antenna which receives the mobile phone signal). However, an alternative embodiment may be operative to detect mobile phone usage by monitoring Bluetooth signals (or other short range wireless signals) between a mobile phone in the vehicle and a hands free device. Thus, as used herein the detection of a mobile phone signal (such as those between the mobile phone and a cell tower) also includes the detection of such signals indirectly through detection of other signals transmitted to and/or received from the mobile phone (e.g. Bluetooth).

In addition, in a further alternative embodiment of the detection system, the detection system may correspond to software and/or firmware that is installed on a mobile phone being monitored. In this embodiment, the processor (which carries out the described functions of the detection system) is the processor of the mobile phone. Also in this embodiment, the mobile phone signal receiving device, may include software that is operative to detect when the mobile phone is being used (e.g. to make calls, text message etc.) through the internal software, data, and/or hardware of the mobile phone.

In this described embodiment, the detection system may communicate with the remote server through the communicating features of the mobile phone. For example, if the mobile phone includes Internet access, the described detection system may use the Internet access of the mobile phone to communicate with the remote server through the Internet. However, if the mobile phone only includes voice communications (e.g. no Internet access), the described detection system may be operative to call a phone number associated with the remote server to communicate data via a modem connection.

In addition, in this described embodiment, the detection system may use the GPS capabilities of the mobile phone to determine the location and/or velocity of the vehicle. In this embodiment, the detection system is operative to determine that the detected mobile phone signals (detected via software/hardware) are being transmitted from a predetermined location corresponding to the inside of a vehicle, based on the detected velocity surpassing a predetermined threshold. For example, when the determined velocity is relatively low and is compatible with a person walking (e.g. 2 miles/hour), the detection system may be operative to not report the detection of transmission of the mobile phone signals to the remote server. However, when the velocity is above a threshold typically associated with a moving vehicle (e.g. above 15 miles/hour), the detection system may be operative to store and/or report data regarding the mobile phone use to the remote server.

In this described embodiment of the detection system operating in the mobile phone, the detection system may correspond to a detection application that is downloaded and installed on the phone. Such a detection application may have security features which prevent a user (without a proper password or other credential) from temporarily deactivating the application in order to make undetected mobile phone calls while driving the vehicle. Alternatively, if the user using the phone retains the ability to deactivate this described detection application, the detection application may include a log of when the detection application was running and may be operative to compare this to a log of when the mobile phone was powered on, in order to detect and report to the remote server that the detection application was deactivate for a period of time while the phone was still powered on.

As discussed previously, some embodiments described herein may include the use of an infrared illuminator that is positioned to transmit infrared light through a window of a vehicle so as to reflect off of a driver of the vehicle and be captured by an image capturing device. Such systems may be located adjacent roads and highways in jurisdictions that prohibit drivers from holding a mobile phone to carry out mobile phone communications while driving. In another embodiment, an infrared illuminator detection device may be produced that includes one or more photo sensors adapted to detect the presence of the specific wavelength (e.g., 800 nm to 820 nm) of light transmitted from such infrared illuminators. Such an infrared illuminator detection device may include an output device such as an audible and/or visible output device that emits a sound and/or light when infrared light is detected from an infrared illuminator. In this described embodiment, the infrared detection device may be a portable device capable of being mounted adjacent to or on a dashboard or other area of a vehicle adjacent the inside windshield of the vehicle.

This described infrared illuminator detection device may also be incorporated into a radar/laser detector for use with detecting radar/laser speed detectors. This described infrared illuminator detection device may also be incorporated into and/or include a jamming device capable of emitting an infrared light inside the vehicle which produces reflected infrared light that obscures the details of the inside of the vehicle that may be captured by an infrared image capturing device associated with the detected infrared illuminator. The emitting of infrared light by the jamming device may be triggered by the detection of an infrared illuminator using the described infrared illuminator detection device.

In the described embodiments, the system and method steps have been described as being carried out by various components of the system. Such components may include one or more computers and servers having processors that are operative to carry out the steps and features described herein. For example, the computer may be operative to acquire the data captured by one or more of the described cameras, mobile phone signal receiving devices, and other sensor devices and store the data from a detected event in a data store locally and/or remotely from the computer. Further, the computer may be operative to carry out the monitoring of acquired data to determine when to trigger events such as capturing images of a moving vehicle. Further, the computer may be operative to carry out correlating data from different devices to determine which vehicle on the road is the source of mobile phone signals. In addition, the computer may be operative to carry out signal analysis and/or image analysis on the information provided by the various detectors to achieve a more accurate determination of whether illegal mobile phone usage is taking place in a particular vehicle. Also, the computer may be operative to carry out wired and/or wireless communication of the acquired information to one or more remote locations, such as further computers and servers operative to review, report and/or evaluate the information captured and determined by the described system.

Computer executable software instructions used in operating the described systems and connected computers may be loaded from computer readable media or articles of various types into the respective computers to cause processors to carry out the described methods herein. Such computer software may be included on and loaded from one or more articles such as compact disks, DVDs and other optical or magnetic media. Such software may also be included on articles such as hard disk drives, tapes, flash memory drives or other rewritable or read-only drives and storage devices. Other articles which include data representative of the instructions for operating computers in the manner described herein are suitable for use in achieving operation of the systems and methods in accordance with the described embodiments.

Thus the new mobile phone detection systems and methods described herein achieve one or more of the above stated aspects, eliminate difficulties encountered in the use of prior devices and systems, solve problems, and attain the desirable results described herein.

In the foregoing description certain terms have been used for brevity, clarity and understanding; however, no unnecessary limitations are to be implied therefrom, because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the embodiment in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method comprising:
   a) through operation of at least one processor located in a vehicle, detecting with at least one mobile phone signal receiving device at least one mobile phone signal produced by a mobile phone;
   b) through operation of the at least one processor and a global positioning system (GPS) device in operative connection with the at least one processor, determining at least one velocity of the vehicle;
   c) responsive at least in part to (b), through operation of the at least one processor determining that the vehicle was moving during (a);
   d) through operation of the at least one processor, determining that the detected at least one mobile phone signal originated from a location in the vehicle;
   e) through operation of the at least one processor, storing in at least one data store data associated with the at least one mobile phone signal including at least one of:
      i) at least a portion of the at least one mobile phone signal;
      ii) a duration of the at least one mobile phone signal;
      iii) at least one date and time at which the at least one mobile phone signal was detected;
      iv) the at least one velocity of the vehicle when the at least one mobile phone signal was detected;
      v) at least one location of the vehicle when the at least one mobile phone signal was detected, which at least one location is determined through operation of the GPS device;
      or any combination thereof;
   wherein the at least one data store includes identifying data that is usable to identify at least one of the vehicle, a person associated with the vehicle, or any combination thereof;
   f) through operation of the at least one processor causing a network interface device to send information to a remote server, which information includes the identifying data, data representative of the detection of the at least one mobile phone signal originating from the mobile phone while in the moving vehicle, and data representative of at least a portion of the data stored in the data store associated with the at least one mobile phone signal.

2. The method according to claim 1, further comprising:
   g) emitting radiation from at least one radiation transmitting device;
   h) receiving portions of the radiation with at least one radiation receiving device after the portions of the radiation have reflected off of matter inside the vehicle;
   i) generating at least one digital image including a visual representation of at least portions of the matter inside the vehicle responsive at least in part to the received portions of the radiation;
   wherein in (f) the information includes the at least one digital image.

3. The method according to claim 2, wherein the portions of the radiation include infrared light, wherein the at least one radiation transmitting device includes at least one infrared light illuminator.

4. The method according to claim 3, wherein the at least one digital image depicts an image of a driver holding a mobile phone.

5. The method according to claim 3, further comprising:
   through operation of at least one processor, carrying out facial recognition of at least one face depicted in the at least one digital image to determine data identifying a person.

6. The method according to claim 1, wherein in (f) the information sent to the remote server includes data usable by the remote server to determine the at least one location of the vehicle.

7. The method according to claim 1, wherein in (f) the identifying data identifies the vehicle.

8. The method according to claim 1, wherein (e) includes through operation of the at least one processor, storing in the at least one data store the duration of the at least one mobile phone signal;
   wherein the information communicated in (f) includes data representative of the duration of the at least one mobile phone signal.

9. The method according to claim 1, further comprising:
   g) through operation of the at least one processor, detecting with the network interface device, a wireless network through which the data stored in the data store can be sent to the remote server;
   wherein (f) is carried out responsive to (g).

10. The method according to claim 1, further comprising:
    g) through operation of the at least one processor, receiving with the network interface device a wireless signal through a wireless network, wherein the wireless signal is indicative of a request for the at least one processor to send through a wireless network the information that includes data representative of the detection of the at least one mobile phone signal;
    wherein (f) is carried out responsive at least in part to (g).

11. The method according to claim 1, wherein the at least one processor, the at least one mobile phone signal receiving device, the network interface device, and the GPS device in (a), (b), (c), (d), (e) and (f) are included in the mobile phone from which the at least one mobile phone signal originated.

12. The method according to claim 1,
    wherein the at least one mobile phone signal receiving device is in operative connection with at least one antenna, wherein in (a) the at least one mobile phone signal receiving device is operative to use the at least one antenna to detect the at least one mobile phone signal being produced by the mobile phone from the location in the vehicle.

13. The method according to claim 12, wherein (d) includes determining that the at least one mobile phone signal originated from the vehicle responsive at least in part to the at least one velocity determined in (b).

14. A mobile phone signal detection system comprising:
    at least one processor;
    at least one mobile phone signal receiving device in operative connection with the at least one processor, wherein the at least one mobile phone signal receiving device is operative to detect at least one mobile phone signal originating from a mobile phone in a vehicle;

at least one network interface device in operative connection with the at least one processor;

at least one global positioning systems (GPS) device in operative connection with the at least one processor;

at least one data store in operative connection with the at least one processor;

wherein the at least one processor is operatively programmed to determine at least one velocity associated with the vehicle that includes the mobile phone that produced the at least one mobile phone signal that the at least one mobile phone signal receiving device is operative to detect;

wherein the at least one processor is operatively programmed to determine that the vehicle that includes the mobile phone was moving when the at least one mobile phone signal was detected;

wherein the at least one processor is operatively programmed to store in the at least one data store data associated with the at least one mobile phone signal including at least one of:
  i) at least a portion of the at least one mobile phone signal;
  ii) a duration of the at least one mobile phone signal;
  iii) at least one date and time at which the at least one mobile phone signal was detected;
  iv) the at least one velocity of the vehicle when the at least one mobile phone signal was detected;
  v) at least one location of the vehicle when the at least one mobile phone signal was detected, which at least one location is determined through operation of the GPS device;
  or any combination thereof;

wherein the at least one data store includes identifying data that is usable to identify at least one of the vehicle, a person associated with the vehicle, or any combination thereof;

wherein the at least one processor is operatively programmed to determine that the detected at least one mobile phone signal originated from a location in the vehicle; and wherein the at least one processor is operatively programmed to cause the network interface device to send information to at least one remote server, which information includes the identifying data, data representative of the detection of the at least one mobile phone signal originating from the mobile phone while in the moving vehicle, and data representative of at least a portion of the data stored in the data store associated with the at least one mobile phone signal, which portion includes data representative of the at least one velocity of the vehicle that includes the mobile phone when the at least one mobile phone signal was detected.

15. The apparatus according to claim 14, wherein the GPS device is not a GPS device included in the mobile phone, wherein the at least one processor is operative to determine the at least one velocity responsive at least in part to data generated by the GPS device.

16. The apparatus according to claim 14, wherein the at least one mobile phone signal receiving device is in operative connection with at least one antenna, wherein the at least one mobile phone signal receiving device is operative to use the at least one antenna to detect the at least one mobile phone signal being transmitted by the mobile phone from the location in the vehicle moving in a roadway, wherein the at least one processor is operative to determine that the at least one mobile phone signal originated from the vehicle moving in the roadway responsive at least in part to the determined at least one velocity.

17. The apparatus according to claim 14, further comprising the vehicle, wherein the at least one processor, the at least one mobile phone signal receiving device, and the at least one network interface device are mounted in the vehicle.

* * * * *